(12) United States Patent
Davis

(10) Patent No.: US 12,111,652 B2
(45) Date of Patent: Oct. 8, 2024

(54) ELECTRICAL DISTRIBUTION SYSTEM

(71) Applicant: Verizon Media Inc., New York, NY (US)

(72) Inventor: Jeffrey Alan Davis, Lewiston, NY (US)

(73) Assignee: Yahoo Ad Tech LLC, New York, NY (US)

( * ) Notice: Subject to any disclaimer, the term of this patent is extended or adjusted under 35 U.S.C. 154(b) by 167 days.

(21) Appl. No.: 17/557,339

(22) Filed: Dec. 21, 2021

(65) Prior Publication Data

US 2023/0195052 A1   Jun. 22, 2023

(51) Int. Cl.
  *G05B 9/02*   (2006.01)
  *H02B 1/14*   (2006.01)
  *H02B 1/20*   (2006.01)

(52) U.S. Cl.
  CPC .............. *G05B 9/02* (2013.01); *H02B 1/14* (2013.01); *H02B 1/20* (2013.01)

(58) Field of Classification Search
  None
  See application file for complete search history.

(56) References Cited

U.S. PATENT DOCUMENTS

| | | | |
|---|---|---|---|
| 2009/0108678 A1* | 4/2009 | Algrain | H02J 3/42 307/87 |
| 2010/0087962 A1* | 4/2010 | Ghafurian | H02J 3/007 700/294 |
| 2011/0101773 A1* | 5/2011 | Incerpi | H02J 3/007 307/9.1 |
| 2015/0180275 A1* | 6/2015 | Tomassi | H02J 9/061 307/64 |
| 2020/0153251 A1* | 5/2020 | Frampton | H02J 3/42 |

* cited by examiner

*Primary Examiner* — Jared Fureman
*Assistant Examiner* — Aqeel H Bukhari
(74) *Attorney, Agent, or Firm* — Cooper Legal Group LLC

(57) ABSTRACT

In an example, a system, a method and/or an apparatus are provided. A first power distribution component and a second power distribution component are connected to a busway system including a busway. Whether first electrical power of the first power distribution component and second electrical power of the second power distribution component meet one or more conditions is determined. In response to a condition of the one or more conditions not being met, supply of electrical power from the second power distribution component to the busway system is inhibited.

20 Claims, 10 Drawing Sheets

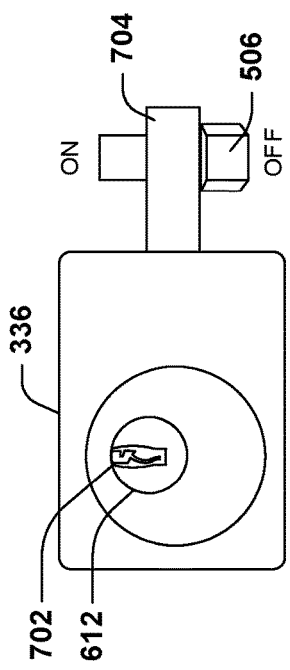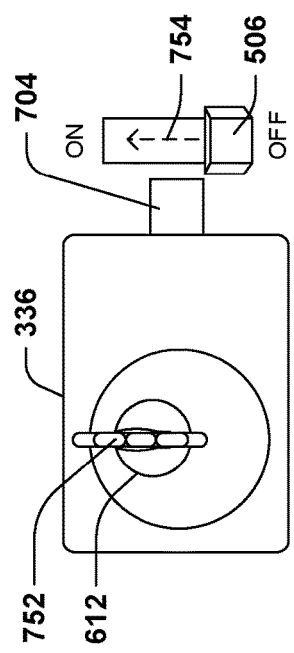

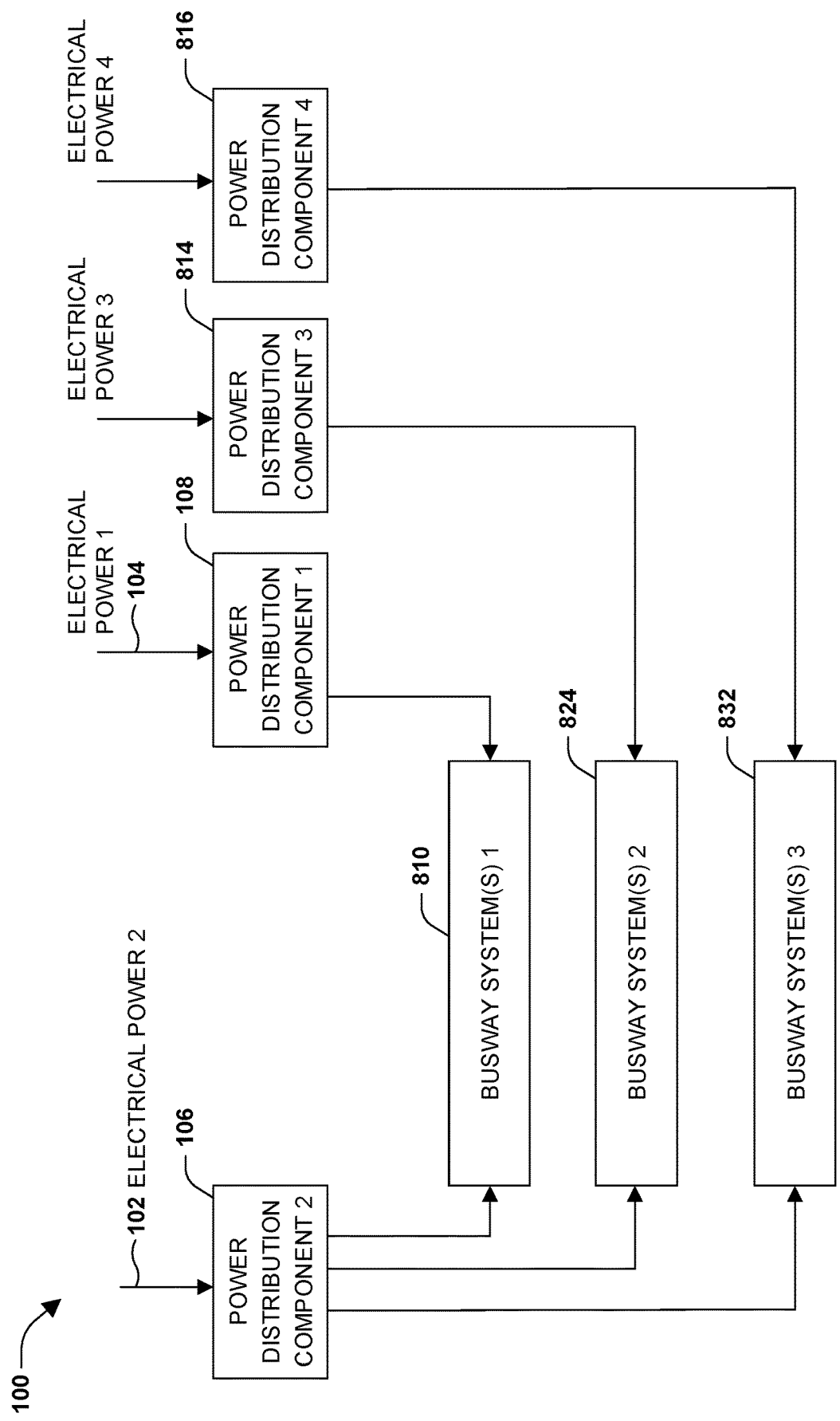

ELECTRICAL DISTRIBUTION SYSTEM

BACKGROUND

A busway may be used in an electrical distribution system to supply electrical power to connected load devices. The busway may be powered using a single power source. Accordingly, electrical power supplied to the connected load devices may be dependent upon the single power source.

SUMMARY

In accordance with the present disclosure, one or more systems, methods and/or apparatuses are provided. In an example, an electrical distribution system is provided. The electrical distribution system comprises a first power distribution component connected to a busway system comprising a busway, a second power distribution component connected to the busway system, and an interlock system. The interlock system is configured to determine whether first electrical power of the first power distribution component and second electrical power of the second power distribution component meet one or more conditions. The interlock system is configured to inhibit supply of electrical power from the second power distribution component to the busway system in response to a condition of the one or more conditions not being met.

In an example, a method is provided. The method comprises determining whether first electrical power of a first power distribution component and second electrical power of a second power distribution component meet one or more conditions, wherein the first power distribution component and the second power distribution component are connected to a busway system comprising a busway. The method comprises inhibiting supply of electrical power from the second power distribution component to the busway system in response to a condition of the one or more conditions not being met.

In an example, an interlock system is provided. The interlock system comprises a processor and memory comprising processor-executable instructions that when executed by the processor cause performance of operations. The operations comprise determining whether first electrical power of a first power distribution component and second electrical power of a second power distribution component meet one or more conditions, wherein the first power distribution component and the second power distribution component are connected to a busway system comprising a busway. The operations comprise inhibiting supply of electrical power from the second power distribution component to the busway system in response to a condition of the one or more conditions not being met.

DESCRIPTION OF THE DRAWINGS

While the techniques presented herein may be embodied in alternative forms, the particular embodiments illustrated in the drawings are only a few examples that are supplemental of the description provided herein. These embodiments are not to be interpreted in a limiting manner, such as limiting the claims appended hereto.

FIG. 7A is a component block diagram illustrating an example scenario in which an interlock device prevents a state of a switch from being changed.

FIG. 7B is a component block diagram illustrating an example scenario in which an interlock device allows a state of a switch to be changed.

FIG. 8 is a component block diagram illustrating an example embodiment of an electrical distribution system.

DETAILED DESCRIPTION

Figure 1:
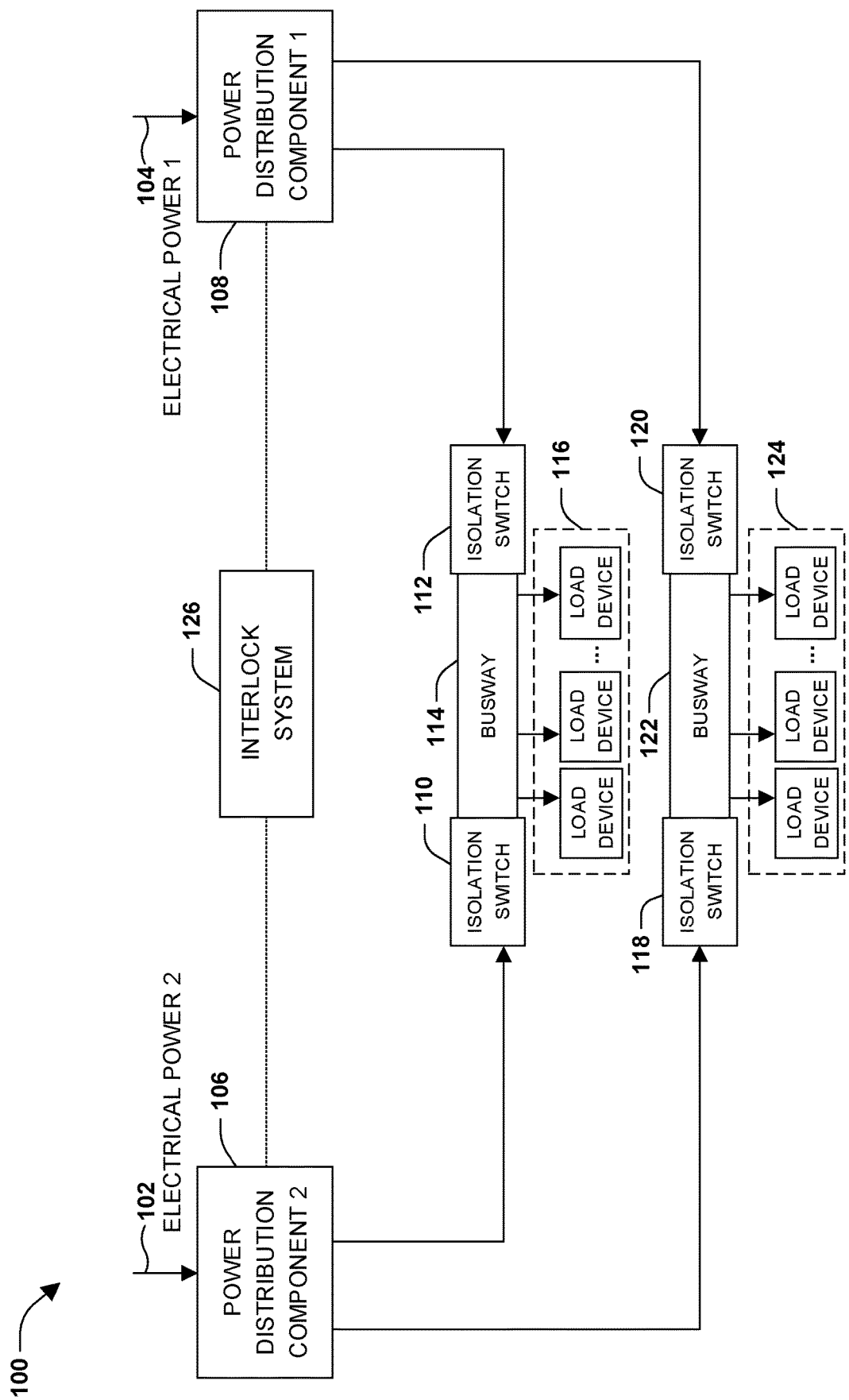
FIG. 1 is a component block diagram illustrating an example embodiment of an electrical distribution system.

Subject matter will now be described more fully hereinafter with reference to the accompanying drawings, which form a part hereof, and which show, by way of illustration, specific example embodiments. This description is not intended as an extensive or detailed discussion of known concepts. Details that are known generally to those of ordinary skill in the relevant art may have been omitted, or may be handled in summary fashion.

The following subject matter may be embodied in a variety of different forms, such as methods, devices, components, and/or systems. Accordingly, this subject matter is not intended to be construed as limited to any example embodiments set forth herein. Rather, example embodiments are provided merely to be illustrative. Such embodiments may, for example, take the form of mechanical devices, electro-mechanical devices, electrical devices, hardware, software, firmware or any combination thereof.

In an electrical distribution system, a busway (e.g., a bus duct) is used to power a load comprising at least one of one or more computers (e.g., one or more servers and/or other types of computers) of a datacenter, one or more devices (e.g., industrial equipment) of an industrial plant and/or a production line, etc. The busway may comprise plugs (e.g., bus plugs, such as interchangeable plugs) that are configured to supply electrical power from the busway to devices of the load and/or may provide protection to the devices. In an example, the plugs may comprise fusible plugs and/or circuit breakers.

In some systems, the busway is powered using a single source of electrical power. Thus, in these systems, in a scenario in which the single source of electrical power fails, the busway (and the load connected to the busway, for example) may cease being supplied with electrical power from the single source of electrical power. Alternatively and/or additionally, in order to perform one or more maintenance operations on one or more components (e.g., the one or more components may comprise one or more components associated with the single source of electrical power and/or one or more components connected to the busway), it may be required to de-energize the one or more components, thereby causing the busway (and the load connected to the busway, for example) to become de-energized (e.g., the busway may cease being supplied with electrical power from the single source of electrical power). De-energizing the busway may disrupt operation performed by the load and may result in losses (e.g., losses as a result of devices of the load not being powered to operate while the busway is de-energized) and/or damage to equipment of the load.

Thus, in accordance with one or more of the techniques provided herein, the busway may be powered using multiple sources of electrical power. Accordingly, in a scenario in which a first source of electrical power of the multiple sources of electrical power fails, the busway may be power using a second source of electrical power of the multiple sources of electrical power. Alternatively and/or additionally, in order to perform one or more maintenance operations on one or more components (e.g., the one or more components may comprise one or more components associated with the first source of electrical power and/or one or more components connected to the busway), the one or more components may be de-energized while the busway (and the load connected to the busway, for example) are powered by the second power source.

In an example, a transition process (e.g., a closed transition process) may be performed to transition from a first state of the busway to a second state of the busway and/or a third state of the busway. In the first state, the first source of electrical power may power the busway (e.g., merely the first source of electrical power is used to power the busway in the first state). In the second state, the first source of electrical power and the second source of electrical power may power the busway. In the third state, the second source of electrical power may power the busway (e.g., merely the second source of electrical power is used to power the busway in the third state). When the electrical distribution system is in the third state, one or more components may be de-energized (e.g., the one or more components may comprise one or more components associated with the first source of electrical power and/or one or more components connected to the busway), thereby providing for concurrent maintainability of the electrical distribution system and/or the busway and/or enabling one or more maintenance operations to be safely performed on the one or more components without disrupting power to the busway and/or the load.

FIG. 1 illustrates an example embodiment of an electrical distribution system 100. In some examples, the electrical distribution system 100 comprises a first power distribution component 108, a second power distribution component 106, an interlock system 126 and/or one or more busway systems. The first power distribution component 108 may be supplied with first electrical power 104 and/or the second power distribution component 106 may be supplied with second electrical power 102. In an example, the first electrical power 104 and the second electrical power 102 may each be three-phase electrical power. In an example, the first electrical power 104 and the second electrical power 102 may each be single phase electrical power.

In the example shown in FIG. 1, the one or more busway systems of the electrical distribution system 100 comprise a first busway system and a second busway system. The first busway system comprises a first busway 114 (e.g., a first critical distribution busway), a first isolation switch 112 and/or a second isolation switch 110. The first isolation switch 112 may be connected to a first side of the first busway 114 and/or the second isolation switch 110 may be connected to a second side of the first busway 114 (e.g., the second side of the first busway 114 may be opposite the first side of the first busway 114). The first busway system is configured to supply power to a first set of loads 116 (e.g., at least one of one or more computers of a datacenter, one or more devices of an industrial plant and/or a production line, etc.). The second busway system comprises a second busway 122 (e.g., a second critical distribution busway), a third isolation switch 120 and/or a fourth isolation switch 118. The third isolation switch 120 may be connected to a first side of the second busway 122 and/or the fourth isolation switch 118 may be connected to a second side of the second busway 122 (e.g., the second side of the second busway 122 may be opposite the first side of the second busway 122). The second busway system is configured to supply power to a second set of loads 124 (e.g., at least one of one or more computers of a datacenter, one or more devices of an industrial plant and/or a production line, etc.). Although FIG. 1 shows the one or more busway systems comprising two busway systems, it may be appreciated that the one or more busway systems may comprise any number of busway systems, such as one busway system, three busway systems, etc.

In some examples, the first isolation switch 112, the second isolation switch 110, the third isolation switch 120 and/or the fourth isolation switch 118 may be used for interruption of power flow (for maintenance of one or more components, for example). In an example, the first isolation switch 112 may correspond to a switch of a first isolation breaker, the second isolation switch 110 may correspond to a switch of a second isolation breaker, the third isolation switch 120 may correspond to a switch of a third isolation breaker and/or the fourth isolation switch 118 may correspond to a switch of a fourth isolation breaker.

In an example, the first power distribution component 108 comprises a first uninterrupted distribution panel (UDP) and/or a first power distribution unit (PDU). In an example, the second power distribution component 106 comprises a second UDP and/or a second PDU.

The interlock system 126 may be connected to the first power distribution component 108 and/or the second power distribution component 106. The interlock system 126 may determine whether one or more conditions are met. The one or more conditions may correspond to one or more conditions for allowing supply of electrical power from a power distribution component (e.g., the first power distribution component 108 or the second power distribution component 106) to a busway system of the one or more busway systems. In an example, the one or more conditions may correspond to one or more conditions for performing a transition process (e.g., a closed transition) of a busway system of the electrical distribution system 100 (e.g., the transition process may be performed to transition between states of the busway system).

The first busway system may be in a first state, in a second state and/or in a third state.

When the first busway system is in the first state, the first power distribution component 108 supplies electrical power to the first busway system (comprising the first busway 114, the first isolation switch 112 and/or the second isolation switch 110) and the second power distribution component 106 does not supply electrical power to the first busway system (e.g., in the first state, the first busway system is not isolated from electrical power of the first power distribution component 108 and the first busway system is isolated from electrical power of the second power distribution component 106). In an example, when the first busway system is in the first state, merely the first power distribution component 108 supplies electrical power to the first busway system. In some examples, when the first busway system is in the first state, the first isolation switch 112 and/or the second isolation switch 110 may be in closed state. Closed state of a switch may correspond to a state in which electrical power can pass through the switch. For example, when the first busway system is in the first state, electrical power from the first power distribution component 108 may pass through the first isolation switch 112 to the first busway 114.

When the first busway system is in the second state, the first power distribution component 108 and the second power distribution component 106 supply electrical power to the first busway system (e.g., in the second state, the first busway system is not isolated from electrical power of the first power distribution component 108 and the second power distribution component 106). In some examples, when the first busway system is in the second state, the first isolation switch 112 and/or the second isolation switch 110 may be in closed state. For example, when the first busway system is in the second state, electrical power from the first power distribution component 108 may pass through the first isolation switch 112 to the first busway 114 and electrical power from the second power distribution component 106 may pass through the second isolation switch 110 to the first busway 114.

When the first busway system is in the third state, the second power distribution component 106 supplies electrical power to the first busway system and the first power distribution component 108 does not supply electrical power to the first busway system (e.g., in the third state, the first busway system is not isolated from electrical power of the second power distribution component 106 and the first busway system is isolated from electrical power of the first power distribution component 108). In an example, when the first busway system is in the third state, merely the second power distribution component 106 supplies electrical power to the first busway system. In some examples, when the first busway system is in the third state, the first isolation switch 112 and/or the second isolation switch 110 may be in closed state. For example, when the first busway system is in the third state, electrical power from the second power distribution component 106 may pass through the second isolation switch 110 to the first busway 114.

When the first busway system is in the first state, in response to one or more first conditions being met, the interlock system 126 may allow supply of electrical power from the second power distribution component 106 to the first busway system. For example, when the first busway system is in the first state, in response to the one or more first conditions being met, the interlock system 126 may allow transition from the first state of the first busway system to the second state.

Alternatively and/or additionally, when the first busway system is in the first state, in response to a condition of the one or more first conditions not being met, the interlock system 126 may inhibit (e.g., not allow and/or prevent) supply of electrical power from the second power distribution component 106 to the first busway system. For example, when the first busway system is in the first state, in response to a condition of the one or more first conditions not being met, the interlock system 126 may inhibit transition from the first state of the first busway system to the second state and/or the third state.

When the first busway system is in the third state, in response to one or more second conditions being met, the interlock system 126 may allow supply of electrical power from the first power distribution component 108 to the first busway system. For example, when the first busway system is in the third state, in response to the one or more second conditions being met, the interlock system 126 may allow transition from the third state of the first busway system to the second state.

Alternatively and/or additionally, when the first busway system is in the third state, in response to a condition of the one or more second conditions not being met, the interlock system 126 may inhibit supply of electrical power from the first power distribution component 108 to the first busway system. For example, when the first busway system is in the third state, in response to a condition of the one or more second conditions not being met, the interlock system 126 may inhibit transition from the third state of the first busway system to the second state and/or the first state.

In some examples, when the first busway system is in the second state, the interlock system 126 may allow transition of the first busway system to the first state or the third state. In an example, when the first busway system is in the second state, the first busway system may transition to the first state by isolating (using a switch, for example) the first busway system from electrical power of the second power distribution component 106. In an example, when the first busway system is in the second state, the first busway system may transition to the third state by isolating (using a switch, for example) the first busway system from electrical power of the first power distribution component 108.

In a first example scenario, the first busway system is in the first state (in which the first power distribution component 108 supplies electrical power to the first busway system, for example). A transition process (e.g., a closed transition process) may be performed to transition from the first state of the first busway system to the third state of the first busway system. The transition process may comprise a transition from the first state of the first busway system to the second state (e.g., the transition from the first state to the second state may be performed when the transition is allowed by the interlock system 126, such as when the one or more first conditions are met) and a transition from the second state of the first busway system to the third state (e.g., the transition from the second state to the third state may be performed by isolating the first busway system from electrical power of the first power distribution component 108). In some examples, the transition process may be performed to perform one or more maintenance operations on one or more components comprising at least one of one or more components associated with the first power distribution component 108, one or more components connected to the first power distribution component 108, one or more components within the first power distribution component 108, one or more components connected to the first busway system, one or more components that are upstream of the first busway system, one or more components that are not isolated from the first busway system when the first busway system is in the first state and are isolated from the first busway system when the first busway system is in the third state, etc. In an example, when the first busway system is in the third state (e.g., after performing the transition process) the one or more maintenance operations may be performed (e.g., the one or more maintenance operations may comprise at least one of repairing a component, replacing a component, testing a component, etc.), wherein the one or more maintenance operations may be performed when a power source of the first power distribution component 108 is turned off and/or isolated from the one or more components (such that the one or more components are de-energized and/or to provide increased safety associated with performing the one or more maintenance operations). Accordingly, the transition process (from the first state of the first busway system to the third state) and/or the one or more maintenance operations may be performed safely without disrupting supply of electrical power to the first set of loads 116.

In a second example scenario, the first busway system is in the third state (in which the second power distribution component 106 supplies electrical power to the first busway system, for example). A transition process (e.g., a closed transition process) may be performed to transition from the third state of the first busway system to the first state of the first busway system. The transition process may comprise a transition from the third state of the first busway system to the second state (e.g., the transition from the third state to the second state may be performed when the transition is allowed by the interlock system 126, such as when the one or more second conditions are met) and a transition from the second state of the first busway system to the first state (e.g., the transition from the second state to the first state may be performed by isolating the first busway system from electrical power of the second power distribution component 106). In some examples, the transition process may be performed to perform one or more maintenance operations on one or more components comprising at least one of one or more components associated with the second power distribution component 106, one or more components connected to the second power distribution component 106, one or more components within the second power distribution component 106, one or more components connected to the first busway system, one or more components that are upstream of the first busway system, one or more components that are not isolated from the first busway system when the first busway system is in the third state and are isolated from the first busway system when the first busway system is in the first state, etc. In an example, when the first busway system is in the first state (e.g., after performing the transition process) the one or more maintenance operations may be performed (e.g., the one or more maintenance operations may comprise at least one of repairing a component, replacing a component, testing a component, etc.), wherein the one or more maintenance operations may be performed when a power source of the second power distribution component 106 is turned off and/or isolated from the one or more components (such that the one or more components are de-energized and/or to provide increased safety associated with performing the one or more maintenance operations). Accordingly, the transition process (from the third state of the first busway system to the first state) and/or the one or more maintenance operations may be performed safely without disrupting supply of electrical power to the first set of loads 116.

Transition of the second busway system (and/or one or more other busway systems of the one or more busway systems) between states (e.g., the first state, the second state and/or the third state) may be controlled (using the interlock system 126) using one or more of the techniques provided herein with respect to transition of the first busway system between states.

In some examples, the one or more first conditions may be the same as the one or more second conditions. Alternatively and/or additionally, the one or more first conditions may be different than the one or more second conditions. In some examples, one or more conditions of the one or more first conditions may be the same as one or more conditions of the one or more second conditions.

In some examples, the one or more first conditions and/or the one or more second conditions may comprise one or more third conditions associated with third electrical power of the first power distribution component 108 (e.g., the third electrical power may correspond to the first electrical power 104 and/or other electrical power of the first power distribution component 108) and/or fourth electrical power of the second power distribution component 106 (e.g., the fourth electrical power may correspond to the second electrical power 102 and/or other electrical power of the second power distribution component 106). For example, the interlock system 126 may determine whether the third electrical power and/or the fourth electrical power meet the one or more third conditions. In some examples, the interlock system 126 monitors (e.g., continuously monitors) the third electrical power of the first power distribution component 108 and/or the fourth electrical power of the second power distribution component 106 to determine whether the third electrical power and/or the fourth electrical power meet the one or more third conditions.

In some examples, the interlock system 126 comprises a measurement device. The measurement device may be connected to the first power distribution component 108 and/or the second power distribution component 106. In an example, the measurement device may comprise one or more electrical measurement instruments configured to measure one or more electrical properties (e.g., the measurement device may comprise a power meter). The measurement device may measure one or more measurements comprising a first voltage of the third electrical power, a second voltage of the fourth electrical power, a first frequency of the third electrical power, a second frequency of the fourth electrical power, a first phase of the third electrical power, a second phase of the fourth electrical power, a first rotation (e.g., a phase rotation and/or a phase sequence) of the third electrical power, a second rotation (e.g., a phase rotation and/or a phase sequence) of the fourth electrical power, a first ampacity of the third electrical power, a second ampacity of the fourth electrical power and/or one or more other measurements of the third electrical power and/or the fourth electrical power. Whether the one or more third conditions are met may be determined based upon the one or more measurements determined using the measurement device.

In some examples, the one or more third conditions comprise a first condition that the third electrical power and the fourth electrical power are synchronized. The interlock system 126 may determine whether the first condition is met (e.g., whether the third electrical power and the fourth electrical power are synchronized) based upon the one or more measurements. The interlock system 126 may determine that the first condition is met based upon the third electrical power and the fourth electrical power being synchronized. In an example, the measurement device may comprise a synchronization check meter configured to determine whether the third electrical power and the fourth electrical power are synchronized.

In some examples, the one or more third conditions comprise a second condition that the first voltage of the third electrical power matches the second voltage of the fourth electrical power. The interlock system 126 may determine whether the second condition is met (e.g., whether the first voltage of the third electrical power matches the second voltage of the fourth electrical power) by comparing the first voltage with the second voltage. The interlock system 126 may determine that the second condition is met (e.g., that the first voltage matches the second voltage) based upon a difference between the first voltage and the second voltage being less than a threshold voltage difference. Alternatively and/or additionally, the interlock system 126 may determine that the second condition is not met (e.g., that the first voltage does not match the second voltage) based upon the difference between the first voltage and the second voltage being greater than the threshold voltage difference.

In some examples, the one or more third conditions comprise a third condition that the first frequency of the third electrical power matches the second frequency of the fourth electrical power. The interlock system 126 may determine whether the third condition is met (e.g., whether the first frequency of the third electrical power matches the second frequency of the fourth electrical power) by comparing the first frequency with the second frequency. The interlock system 126 may determine that the third condition is met (e.g., that the first frequency matches the second frequency) based upon a difference between the first frequency and the second frequency being less than a threshold frequency difference. Alternatively and/or additionally, the interlock system 126 may determine that the third condition is not met (e.g., that the first frequency does not match the second frequency) based upon the difference between the first frequency and the second frequency being greater than the threshold frequency difference.

In some examples, the one or more third conditions comprise a fourth condition that the first rotation of the third electrical power matches the second rotation of the fourth electrical power. In an example, a rotation (e.g., the first rotation and/or the second rotation) may be a characteristic of voltage waveforms in an electrical system (e.g., a polyphase electrical system). In an example, the rotation may be clockwise or counterclockwise. In an example in which electrical power is three-phase electrical power with phases "A", "B", and "C", the rotation of the electrical power may correspond to a rotation sequence of A-B-C or a rotation sequence of C-B-A. In an example in which the third electrical power and the fourth electrical power are each three-phase electrical power, the first rotation may match the second rotation if both the first rotation and the second rotation correspond to a sequence of A-B-C or if both the first rotation and the second rotation correspond to a sequence of C-B-A. In some examples, whether or not the first rotation matches the second rotation may be verified at (and/or after) a time of installation of one or more components (e.g., the one or more components may comprise the first power distribution component 108, one or more components that supply power to the first power distribution component 108, the second power distribution component 106 and/or one or more components that supply power to the second power distribution component 106). In some examples, the first rotation and/or the second rotation may not be expected to change without one or more changes being introduced to the electrical distribution system 100 and/or a system connected to the electrical distribution system 100. In an example, the one or more changes (that may cause the first rotation and/or the second rotation to change) may comprise at least one of one or more changes to one or more components of the electrical distribution system 100 (e.g., adding and/or removing a component of the electrical distribution system 100), one or more changes to one or more components connected to the electrical distribution system 100 (e.g., adding and/or removing a component connected to the electrical distribution system 100), one or more changes to an exterior of a facility associated with the electrical distribution system 100 (e.g., installation and/or removal of a transformer, such as a transformer connected to the electrical distribution system 100), one or more changes to an interior of the facility associated with the electrical distribution system 100 (e.g., installation and/or removal of a temporary power source), and/or one or more changes in termination of a polyphase electrical conductor with a component. In some examples, whether the fourth condition is met may be determined in response to a change of the one or more changes occurring.

In some examples, the one or more third conditions comprise a fifth condition that the first phase of the third electrical power matches the second phase of the fourth electrical power. The interlock system 126 may determine whether the fifth condition is met (e.g., whether the first phase of the third electrical power matches the second phase of the fourth electrical power) by comparing the first phase with the second phase. The interlock system 126 may determine that the fifth condition is met (e.g., that the first phase matches the second phase) based upon a difference between the first phase and the second phase being less than a threshold phase difference. Alternatively and/or additionally, the interlock system 126 may determine that the fifth condition is not met (e.g., that the first phase does not match the second phase) based upon the difference between the first phase and the second phase being greater than the threshold phase difference.

In some examples, the one or more third conditions comprise a sixth condition that the first ampacity of the third electrical power matches the second ampacity of the fourth electrical power. The interlock system 126 may determine whether the sixth condition is met (e.g., whether the first ampacity of the third electrical power matches the second ampacity of the fourth electrical power) by comparing the first ampacity with the second ampacity. The interlock system 126 may determine that the sixth condition is met (e.g., that the first ampacity matches the second ampacity) based upon a difference between the first ampacity and the second ampacity being less than a threshold ampacity difference. Alternatively and/or additionally, the interlock system 126 may determine that the sixth condition is not met (e.g., that the first ampacity does not match the second ampacity) based upon the difference between the first ampacity and the second ampacity being greater than the threshold ampacity difference.

In some examples, the one or more first conditions (associated with transition from the first state of the first busway system to the second state) comprise a seventh condition that an available capacity associated with the second power distribution component 106 (e.g., an available capacity of the second power distribution component 106 and/or an available capacity of a generator and/or power supply that supplies electrical power to the second power distribution component 106) does not meet a threshold. The threshold may be based upon (e.g., equal to) anticipated power consumption of the first busway system (and/or anticipated power consumption of the one or more busway systems connected to the first power distribution component 108). The interlock system 126 may determine that the seventh condition is met if the available capacity meets (e.g., exceeds) the threshold. Alternatively and/or additionally, the interlock system 126 may determine that the seventh condition is not met if the available capacity does not meet (e.g., is less than) the threshold. Accordingly, the interlock system 126 may prevent the one or more busway systems from being powered by the second power distribution component 106 if the one or more busway systems being powered by the second power distribution component 106 would overload the second power distribution component 106 (and/or overload a power supply that supplies electrical power to the second power distribution component 106). In an example in which the available capacity is 600 kilowatts and an anticipated power consumption of the one or more busway systems is equal to or less than 600 kilowatts, the seventh condition may be met.

In some examples, the one or more second conditions (associated with transition from the third state of the first busway system to the second state) comprise an eighth condition that an available capacity associated with the first power distribution component 108 (e.g., an available capacity of the first power distribution component 108 and/or an available capacity of a generator and/or power supply that supplies electrical power to the first power distribution component 108) does not meet a threshold. The threshold may be based upon (e.g., equal to) anticipated power consumption of the first busway system (and/or anticipated power consumption of the one or more busway systems connected to the first power distribution component 108). The interlock system 126 may determine that the eighth condition is met if the available capacity meets (e.g., exceeds) the threshold. Alternatively and/or additionally, the interlock system 126 may determine that the eighth condition is not met if the available capacity does not meet (e.g., is less than) the threshold.

Figure 2:
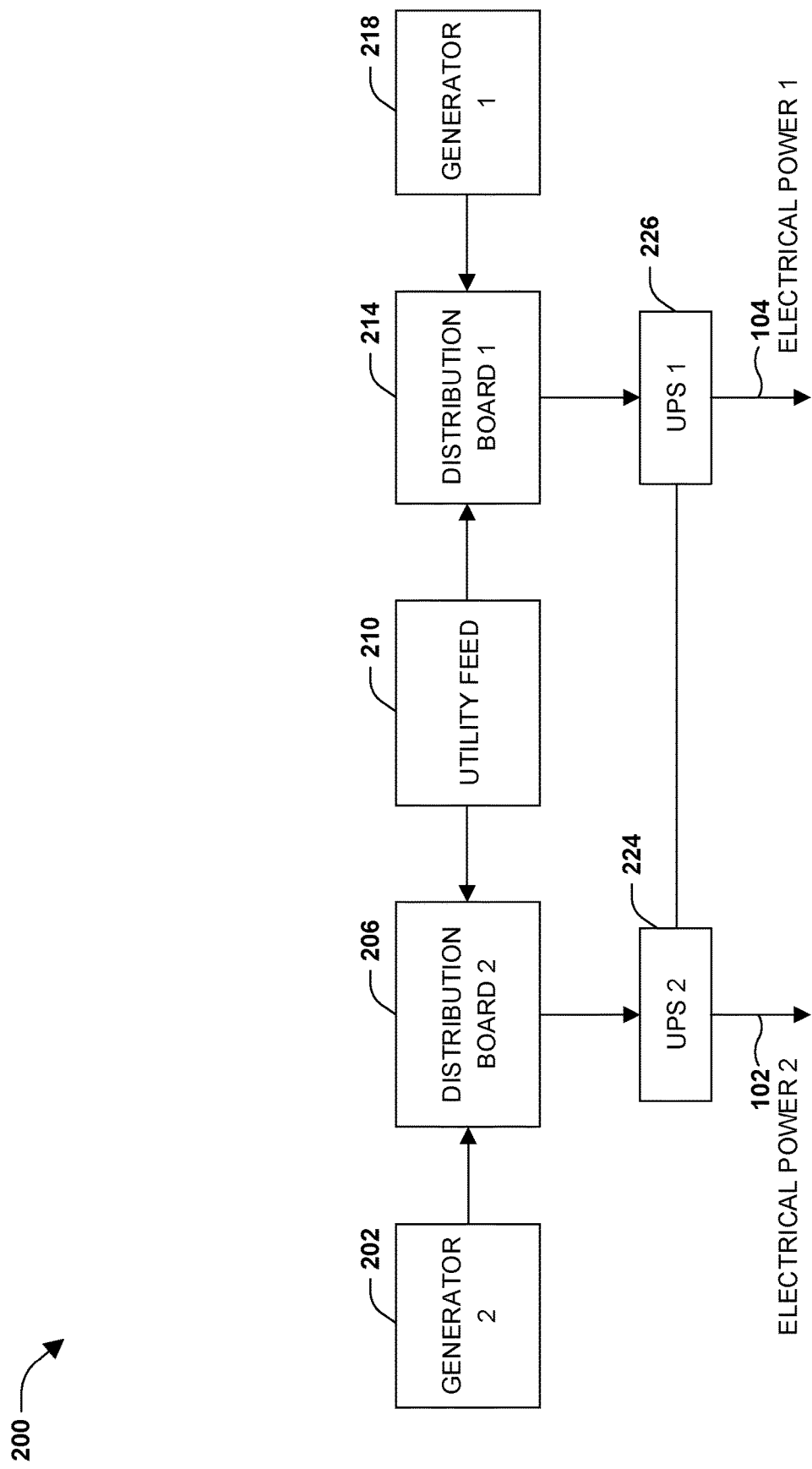
FIG. 2 is a component block diagram illustrating an example embodiment of system configured to generate first electrical power and/or second electrical power.

FIG. 2 illustrates an example embodiment of a system 200 configured to generate the first electrical power 104 and/or the second electrical power 102. The system 200 comprises a first generator 218, a second generator 202, a first distribution board 214, a second distribution board 206, a utility feed 210, a first uninterruptible power supply (UPS) 226 and/or a second UPS 224. In some examples, the first distribution board 214 supplies electrical power that is generated by the first generator 218 to the first UPS 226 (e.g., the first distribution board 214 may supply the electrical power to the first UPS 226 based upon a signal from the utility feed 210). In some examples, the second distribution board 206 supplies electrical power that is generated by the second generator 202 to the second UPS 224 (e.g., the second distribution board 206 may supply the electrical power to the second UPS 224 based upon a signal from the utility feed 210). In some examples, the first generator 218 and the second generator 202 are independent and/or separate from each other (e.g., electrical power generated by the first generator 218 is generated independently and/or separately from electrical power generated by the second generator 202). In some examples, the second UPS 224 may output the second electrical power 102 (e.g., the second UPS 224 may output the second electrical power 102 with protection from input power interruptions). In some examples, the second UPS 224 may use electrical power from the second distribution board 206 to supply the second electrical power 102 to the second power distribution component 106.

In some examples, the first UPS 226 may output the first electrical power 104 (e.g., the first UPS 226 may output the first electrical power 104 with protection from input power interruptions). In some examples, the first UPS 226 may use electrical power from the first distribution board 214 to supply the first electrical power 104 to the first power distribution component 108. Alternatively and/or additionally, the first UPS 226 may use electrical power from the second UPS 224 to supply the first electrical power 104 to the first power distribution component 108. In some examples, the first UPS 226 is a dual feed UPS. In some examples, the first UPS 226 may switch between using electrical power from the first distribution board 214 and using electrical power from the second UPS 224 to supply the first electrical power 104 to the first power distribution component 108.

In some examples, the interlock system 126 (e.g., an interlock control system 330, of the interlock system 126, shown in FIGS. 3-6) may provide a transfer inhibit to equipment (e.g., equipment configured to transfer electrical power sources). The transfer inhibit may be provided to prevent the equipment from transferring from using a first electrical power source to using a second electrical power source. In an example, the transfer inhibit may be provided to the equipment when the one or more first conditions are met and/or when the one or more second conditions are met (e.g., the transfer inhibit may be provided to inhibit transfer between electrical power sources when the one or more first conditions and/or the one or more second conditions are met, thereby preventing a transfer between electrical power sources from causing an out of tolerance condition in the electrical distribution system 100 and/or preventing a transfer between electrical power sources from causing the electrical distribution system 100 to change from meeting the one or more first conditions and/or the one or more second conditions to not meeting the one or more first conditions and/or the one or more second conditions). In an example, providing the transfer inhibit may comprise transmitting a transfer inhibit signal (e.g., a UPS transfer inhibit signal) to the first UPS 226 (e.g., the transfer inhibit signal may be transmitted to a UPS input, of the first UPS 226, for the transfer inhibit signal). The transfer inhibit signal may control the first UPS 226 to not switch between using electrical power from the first distribution board 214 and using electrical power from the second UPS 224 when the one or more first conditions are met and/or when the one or more second conditions are met. Alternatively and/or additionally, one or more transfer inhibit signals may be transmitted to a distribution board (e.g., the first distribution board 214 and/or the second distribution board 206) to prevent a change of source of the distribution board (e.g., a change of utility and/or generator that supplies the distribution board with electrical power) when the one or more first conditions are met and/or when the one or more second conditions are met (e.g., the one or more transfer inhibit signals may prevent electrical power supplied to one or more components connected to the distribution board from being changed and/or transferred when the one or more first conditions are met and/or when the one or more second conditions are met).

In some examples, a power distribution component of the electrical distribution system 100 (e.g., the first power distribution component 108 or the second power distribution component 106) is a reserve power distribution component. In an example, the first power distribution component 108 may be a primary power distribution component (e.g., a power distribution component normally and/or primarily used to power the one or more busway systems) and/or the second power distribution component 106 may be a reserve power distribution component (e.g., a power distribution component that is used to power the one or more busway systems in at least one of a scenario in which a disruption to the first electrical power 104 occurs, a scenario in which one or more maintenance operations are to be performed on the first power distribution component 108 and/or one or more other components, a scenario in which there is power failure at the first power distribution component 108, the first UPS 226 and/or the first generator 218, etc.). In an example in which the first power distribution component 108 is the primary power distribution component and/or the second power distribution component 106 is the reserve power distribution component, the first generator 218 may correspond to a primary generator, the first distribution board 214 may correspond to a primary distribution board, the first UPS 226 may correspond to a primary UPS, the second generator 202 may correspond to a reserve generator, the second distribution board 206 may correspond to a reserve power distribution board and/or the second UPS 224 may correspond to a reserve UPS.

Figure 3:
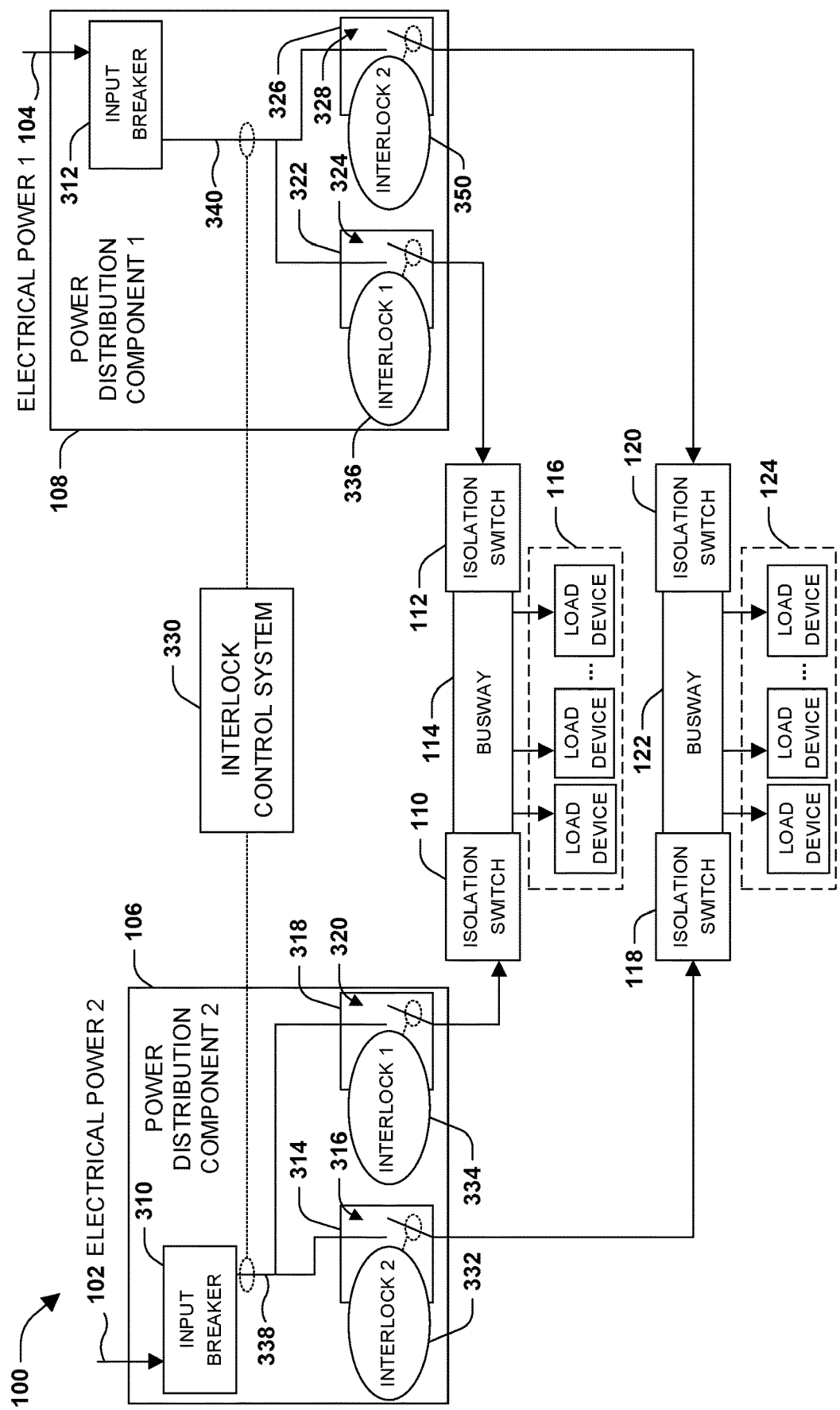
FIG. 3 is a component block diagram illustrating an example embodiment of an electrical distribution system.

FIG. 3 illustrates an example embodiment of the electrical distribution system 100. In the example embodiment of FIG. 3, the interlock system 126 comprises an interlock control system 330 and/or one or more sets of interlock devices. For example, the one or more sets of interlock devices of the interlock system 126 may comprise a set of interlock devices for each busway system of the one or more busway systems. In the example shown in FIG. 3, the one or more sets of interlock devices of the interlock system 126 comprise two sets of interlock devices (e.g., a first set of interlock devices "INTERLOCK 1" comprising a first interlock device 336 and a second interlock device 334, and a second set of interlock devices "INTERLOCK 2" comprising a third interlock device 350 and a fourth interlock device 332). However, it may be appreciated that the one or more sets of interlock devices may comprise any number of sets of interlock devices, such as one set of interlock devices, three sets of interlock devices, etc. In an example, a number of sets of interlock devices of the one or more sets of interlock devices may match a number of busway systems of the one or more busway systems.

In some examples, the interlock control system 330 may comprise the measurement device configured to measure the one or more measurements (associated with the third electrical power and/or the fourth electrical power). The interlock control system 330 (e.g., the measurement device of the interlock control system 330) may be connected to a first node 340 of the first power distribution component 108 and/or a second node 338 of the second power distribution component 106. The interlock control system 330 (e.g., the measurement device of the interlock control system 330) may measure the one or more measurements via the first node 340 and/or the second node 338. In some examples, the interlock control system 330 may be connected to one or more interlock devices of the one or more sets of interlock devices. Alternatively and/or additionally, the interlock control system 330 may control one or more interlock devices of the one or more sets of interlock devices (based upon the one or more measurements, for example).

In some examples, the first power distribution component 108 comprises a first input breaker 312 (e.g., a circuit breaker). The first input breaker 312 may be connected to the first node 340. When a switch of the first input breaker 312 is in a closed state, the first electrical power 104 may pass through the first input breaker 312. In an example, the first input breaker 312 may be rated for over 400 amperes (e.g., the first input breaker 312 may be rated for 800 amperes, 1200 amperes or other value). In some examples, the second power distribution component 106 comprises a second input breaker 310 (e.g., a circuit breaker). The second input breaker 310 may be connected to the second node 338. When a switch of the second input breaker 310 is in a closed state, the second electrical power 203 may pass through the second input breaker 310. In an example, the second input breaker 310 may be rated for over 400 amperes (e.g., the second input breaker 310 may be rated for 800 amperes, 1200 amperes or other value).

In some examples, the electrical distribution system 100 may comprise a first switch 324 associated with the first interlock device 336, a second switch 320 associated with the second interlock device 334, a third switch 328 associated with the third interlock device 350 and/or a fourth switch 316 associated with the fourth interlock device 332. The first switch 324 may correspond to a switch of a first circuit breaker 322 (e.g., an output circuit breaker of the first power distribution component 108), the second switch 320 may correspond to a switch of a second circuit breaker 318 (e.g., an output circuit breaker of the second power distribution component 106), the third switch 328 may correspond to a switch of a third circuit breaker 326 (e.g., an output circuit breaker of the first power distribution component 108) and/or the fourth switch 316 may correspond to a switch of a fourth circuit breaker 314 (e.g., an output circuit breaker of the second power distribution component 106). In some examples, the first circuit breaker 322, the second circuit breaker 318, the third circuit breaker 326 and/or the fourth circuit breaker 314 may be rated for over 100 amperes (e.g., the first input breaker 312 may be rated for 200 amperes, 400 amperes or other value).

A first side of the first switch 324 may be connected to a first circuit (e.g., the first node 340) of the first power distribution component 108 and/or a second side of the first switch 324 may be connected to the first busway system (e.g., the second side of the first switch 324 may be connected to the first isolation switch 112). A first side of the second switch 320 may be connected to a second circuit (e.g., the second node 338) of the second power distribution component 106 and/or a second side of the second switch 320 may be connected to the first busway system (e.g., the second side of the second switch 320 may be connected to the second isolation switch 110). A first side of the third switch 328 may be connected to the first circuit (e.g., the first node 340) of the first power distribution component 108 and/or a second side of the third switch 328 may be connected to the second busway system (e.g., the second side of the third switch 328 may be connected to the third isolation switch 120). A first side of the fourth switch 316 may be connected to the second circuit (e.g., the second node 338) of the second power distribution component 106 and/or a second side of the fourth switch 316 may be connected to the second busway system (e.g., the second side of the fourth switch 316 may be connected to the fourth isolation switch 118).

In some examples, the first interlock device 336 may control the first switch 324 and/or may control access to operate the first switch 324. In an example, the first interlock device 336 may control access to operate a manual switching unit (e.g., at least one of a lever, a handle, a toggle, etc. that can be switched between different positions), of the first circuit breaker 322, that is used to control a state of the first switch 324 and/or the first circuit breaker 322. In an example, the first interlock device 336 may be affixed to a door to a space (e.g., at least one of a space within an enclosure, a space within a panel, a space within a cabinet, etc.) in which the first circuit breaker 322 and/or the manual switching unit of the first circuit breaker 322 are disposed and/or the first interlock device 336 may control whether the door is locked or unlocked (e.g., whether the door can or cannot be opened). Alternatively and/or additionally, the first interlock device 336 may control whether the manual switching unit is able to be switched from a current position (e.g., a current position of the manual switching unit, such as ON position associated with the first switch 324 being in closed state or OFF position associated with the first switch 324 being in open state) to a different position (e.g., a position of the manual switching unit different than the current position). For example, the first interlock device 336 may control whether the manual switching unit is locked in the current position of the manual switching unit (e.g., when the manual switching unit is locked in the current position, the manual switching unit may not be able to be manually switched to another position). For example, the first interlock device 336 may lock the manual switching unit in the current position (e.g., the first interlock device 336 may physically prevent operation of the manual switching unit) by inhibiting movement of the manual switching unit from the current position to another position (e.g., movement of the manual switching unit may be inhibited via a locking mechanism, such as a bolt, in a path of motion of the manual switching unit). In some examples, the first circuit breaker 322 may comprise one or more mechanisms (e.g., one or more internal mechanisms of the first circuit breaker 322) that are connected to (and/or that interact with) a physical lock (of the first interlock device 336), wherein the one or more mechanisms and/or the physical lock of the first interlock device 336 may conduct a mechanical interlock (e.g., a mechanical interlock that locks the manual switching unit in the current position and/or physically prevents operation of the manual switching unit). Alternatively and/or additionally, the first interlock device 336 may control whether a control device, of the first circuit breaker 322, is permitted to change a state of the first switch 324 and/or the first circuit breaker 322. The control device of the first circuit breaker 322 may correspond to an electric control device, such as an automatic control device, that is configured to control the state of the first switch 324 and/or the first circuit breaker 322. For example, the control device may be configured to transfer the state of the first switch 324 and/or the first circuit breaker 322 in response to a trigger, such as at least one of a trigger comprising a received signal (e.g., a signal received from a device, such as at least one of a user operated mechanism, a switch, a button, a control device, etc.), an automatic trigger corresponding to one or more conditions being met (e.g., the one or more conditions being met may trigger the first switch 324 and/or the first circuit breaker 322 to transfer from open state to closed state), etc.

In some examples, the second interlock device 334 may control the second switch 320 and/or may control access to operate the second switch 320. In an example, the second interlock device 334 may control access to operate a manual switching unit (e.g., at least one of a lever, a handle, a toggle, etc. that can be switched between different positions), of the second circuit breaker 318, that is used to control a state of the second switch 320 and/or the second circuit breaker 318. In an example, the second interlock device 334 may be affixed to a door to a space (e.g., at least one of a space within an enclosure, a space within a panel, a space within a cabinet, etc.) in which the second circuit breaker 318 and/or the manual switching unit of the second circuit breaker 318 are disposed and/or the second interlock device 334 may control whether the door is locked or unlocked (e.g., whether the door can or cannot be opened). Alternatively and/or additionally, the second interlock device 334 may control whether the manual switching unit is able to be switched from a current position (e.g., a current position of the manual switching unit, such as ON position associated with the second switch 320 being in closed state or OFF position associated with the second switch 320 being in open state) to a different position (e.g., a position of the manual switching unit different than the current position). For example, the second interlock device 334 may control whether the manual switching unit is locked in the current position of the manual switching unit (e.g., when the manual switching unit is locked in the current position, the manual switching unit may not be able to be manually switched to another position). For example, the second interlock device 334 may lock the manual switching unit in the current position (e.g., the second interlock device 334 may physically prevent operation of the manual switching unit) by inhibiting movement of the manual switching unit from the current position to another position (e.g., movement of the manual switching unit may be inhibited via a locking mechanism, such as a bolt, in a path of motion of the manual switching unit). In some examples, the second circuit breaker 318 may comprise one or more mechanisms (e.g., one or more internal mechanisms of the second circuit breaker 318) that are connected to (and/or that interact with) a physical lock (of the second interlock device 334), wherein the one or more mechanisms and/or the physical lock of the second interlock device 334 may conduct a mechanical interlock (e.g., a mechanical interlock that locks the manual switching unit in the current position and/or physically prevents operation of the manual switching unit). Alternatively and/or additionally, the second interlock device 334 may control whether a control device, of the second circuit breaker 318, is permitted to change a state of the second switch 320 and/or the second circuit breaker 318. The control device of the second circuit breaker 318 may correspond to an electric control device, such as an automatic control device, that is configured to control the state of the second switch 320 and/or the second circuit breaker 318. For example, the control device may be configured to transfer the state of the second switch 320 and/or the second circuit breaker 318 in response to a trigger, such as at least one of a trigger comprising a received signal (e.g., a signal received from a device, such as at least one of a user operated mechanism, a switch, a button, a control device, etc.), an automatic trigger corresponding to one or more conditions being met (e.g., the one or more conditions being met may trigger the second switch 320 and/or the second circuit breaker 318 to transfer from open state to closed state), etc.

In some examples, the third interlock device 350 may control the third switch 328 and/or may control access to operate the third switch 328. In an example, the third interlock device 350 may control access to operate a manual switching unit (e.g., at least one of a lever, a handle, a toggle, etc. that can be switched between different positions), of the third circuit breaker 326, that is used to control a state of the third switch 328 and/or the third circuit breaker 326. In an example, the third interlock device 350 may be affixed to a door to a space (e.g., at least one of a space within an enclosure, a space within a panel, a space within a cabinet, etc.) in which the third circuit breaker 326 and/or the manual switching unit of the third circuit breaker 326 are disposed and/or the third interlock device 350 may control whether the door is locked or unlocked (e.g., whether the door can or cannot be opened). Alternatively and/or additionally, the third interlock device 350 may control whether the manual switching unit is able to be switched from a current position (e.g., a current position of the manual switching unit, such as ON position associated with the third switch 328 being in closed state or OFF position associated with the third switch 328 being in open state) to a different position (e.g., a position of the manual switching unit different than the current position). For example, the third interlock device 350 may control whether the manual switching unit is locked in the current position of the manual switching unit (e.g., when the manual switching unit is locked in the current position, the manual switching unit may not be able to be manually switched to another position). For example, the third interlock device 350 may lock the manual switching unit in the current position (e.g., the third interlock device 350 may physically prevent operation of the manual switching unit) by inhibiting movement of the manual switching unit from the current position to another position (e.g., movement of the manual switching unit may be inhibited via a locking mechanism, such as a bolt, in a path of motion of the manual switching unit). In some examples, the third circuit breaker 326 may comprise one or more mechanisms (e.g., one or more internal mechanisms of the third circuit breaker 326) that are connected to (and/or that interact with) a physical lock (of the third interlock device 350), wherein the one or more mechanisms and/or the physical lock of the third interlock device 350 may conduct a mechanical interlock (e.g., a mechanical interlock that locks the manual switching unit in the current position and/or physically prevents operation of the manual switching unit). Alternatively and/or additionally, the third interlock device 350 may control whether a control device, of the third circuit breaker 326, is permitted to change a state of the third switch 328 and/or the third circuit breaker 326. The control device of the third circuit breaker 326 may correspond to an electric control device, such as an automatic control device, that is configured to control the state of the third switch 328 and/or the third circuit breaker 326. For example, the control device may be configured to transfer the state of the third switch 328 and/or the third circuit breaker 326 in response to a trigger, such as at least one of a trigger comprising a received signal (e.g., a signal received from a device, such as at least one of a user operated mechanism, a switch, a button, a control device, etc.), an automatic trigger corresponding to one or more conditions being met (e.g., the one or more conditions being met may trigger the third switch 328 and/or the third circuit breaker 326 to transfer from open state to closed state), etc.

In some examples, the fourth interlock device 332 may control the fourth switch 316 and/or may control access to operate the fourth switch 316. In an example, the fourth interlock device 332 may control access to operate a manual switching unit (e.g., at least one of a lever, a handle, a toggle, etc. that can be switched between different positions), of the fourth circuit breaker 314, that is used to control a state of the fourth switch 316 and/or the fourth circuit breaker 314. In an example, the fourth interlock device 332 may be affixed to a door to a space (e.g., at least one of a space within an enclosure, a space within a panel, a space within a cabinet, etc.) in which the fourth circuit breaker 314 and/or the manual switching unit of the fourth circuit breaker 314 are disposed and/or the fourth interlock device 332 may control whether the door is locked or unlocked (e.g., whether the door can or cannot be opened). Alternatively and/or additionally, the fourth interlock device 332 may control whether the manual switching unit is able to be switched from a current position (e.g., a current position of the manual switching unit, such as ON position associated with the fourth switch 316 being in closed state or OFF position associated with the fourth switch 316 being in open state) to a different position (e.g., a position of the manual switching unit different than the current position). For example, the fourth interlock device 332 may control whether the manual switching unit is locked in the current position of the manual switching unit (e.g., when the manual switching unit is locked in the current position, the manual switching unit may not be able to be manually switched to another position). For example, the fourth interlock device 332 may lock the manual switching unit in the current position (e.g., the fourth interlock device 332 may physically prevent operation of the manual switching unit) by inhibiting movement of the manual switching unit from the current position to another position (e.g., movement of the manual switching unit may be inhibited via a locking mechanism, such as a bolt, in a path of motion of the manual switching unit). In some examples, the fourth circuit breaker 314 may comprise one or more mechanisms (e.g., one or more internal mechanisms of the fourth circuit breaker 314) that are connected to (and/or that interact with) a physical lock (of the fourth interlock device 332), wherein the one or more mechanisms and/or the physical lock of the fourth interlock device 332 may conduct a mechanical interlock (e.g., a mechanical interlock that locks the manual switching unit in the current position and/or physically prevents operation of the manual switching unit). Alternatively and/or additionally, the fourth interlock device 332 may control whether a control device, of the fourth circuit breaker 314, is permitted to change a state of the fourth switch 316 and/or the fourth circuit breaker 314. The control device of the fourth circuit breaker 314 may correspond to an electric control device, such as an automatic control device, that is configured to control the state of the fourth switch 316 and/or the fourth circuit breaker 314. For example, the control device may be configured to transfer the state of the fourth switch 316 and/or the fourth circuit breaker 314 in response to a trigger, such as at least one of a trigger comprising a received signal (e.g., a signal received from a device, such as at least one of a user operated mechanism, a switch, a button, a control device, etc.), an automatic trigger corresponding to one or more conditions being met (e.g., the one or more conditions being met may trigger the fourth switch 316 and/or the fourth circuit breaker 314 to transfer from open state to closed state), etc.

In some examples, interlock devices of the one or more sets of interlock devices may be electric interlock devices, such as at least one of relays, switches, electric locks, etc. In an example, the first interlock device 336, the second interlock device 334, the third interlock device 350 and/or the fourth interlock device 332 are electric interlock devices (e.g., at least one of relays, switches, electric locks, etc.) and/or are controlled by the interlock control system 330. One or more of the techniques and/or systems provided herein (such as one or more of the techniques and/or systems described with respect to FIGS. 3, 4 and 5A-5B) may be implemented using the electric interlock devices and/or one or more other types of interlock devices (e.g., one or more types of mechanical interlock devices). In an example, interlock devices shown in FIGS. 3, 4 and 5A-5B may be electric interlock devices and/or one or more other types of interlock devices (e.g., one or more types of mechanical interlock devices).

In some examples, in response to the one or more first conditions and/or the one or more second conditions being met, the first interlock device 336, the second interlock device 334, the third interlock device 350 and/or the fourth interlock device 332 may be controlled (by the interlock control system 330, for example) to allow the first switch 324, the second switch 320, the third switch 328 and/or the fourth switch 316, respectively, to be transferred from one state (e.g., open state) to another state (e.g., closed state). For example, in response to the one or more first conditions and/or the one or more second conditions being met, the first interlock device 336, the second interlock device 334, the third interlock device 350 and/or the fourth interlock device 332 may be controlled (by the interlock control system 330, for example) to allow access to operate the manual switching unit of the first circuit breaker 322, the manual switching unit of the second circuit breaker 318, the manual switching unit of the third circuit breaker 326 and/or the manual switching unit of the fourth circuit breaker 314, respectively. Alternatively and/or additionally, in response to the one or more first conditions and/or the one or more second conditions being met, the first interlock device 336, the second interlock device 334, the third interlock device 350 and/or the fourth interlock device 332 may be controlled (by the interlock control system 330, for example) to permit the control device of the first circuit breaker 322 to change the state of the first switch 324, permit the control device of the second circuit breaker 318 to change the state of the second switch 320, permit the control device of the third circuit breaker 326 to change the state of the third switch 328 and/or permit the control device of the fourth circuit breaker 314 to change the state of the fourth switch 316, respectively.

In some examples, when the first busway system is in the first state, the first switch 324 (of the first circuit breaker 322, for example) is in closed state (such that the first power distribution component 108 supplies electrical power to the first busway system, for example) and the second switch 320 (of the second circuit breaker 318) is in open state (such that the first busway system is isolated from electrical power of the second power distribution component 106, for example).

In some examples, when the first busway system is in the second state, the first switch 324 (of the first circuit breaker 322, for example) is in closed state (such that the first power distribution component 108 supplies electrical power to the first busway system, for example) and the second switch 320 (of the second circuit breaker 318) is in closed state (such that the second power distribution component 106 supplies electrical power to the first busway system, for example).

In some examples, when the first busway system is in the third state, the first switch 324 (of the first circuit breaker 322, for example) is in open state (such that the first busway system is isolated from electrical power of the first power distribution component 108, for example) and the second switch 320 (of the second circuit breaker 318) is in closed state (such that the second power distribution component 106 supplies electrical power to the first busway system, for example).

In an example, when the first busway system is in the first state and the one or more first conditions are met, the second interlock device 334 may be controlled (by the interlock control system 330, for example) to allow the second switch 320 to be transferred from open state to closed state. For example, when the first busway system is in the first state and the one or more first conditions are met, the second interlock device 334 may be controlled (by the interlock control system 330, for example) to allow access to operate the manual switching unit of the second circuit breaker 318. For example, the second interlock device 334 may allow the door (to the space in which the second circuit breaker 318 and/or the manual switching unit are disposed) to be opened (such that the manual switching unit can be operated to transfer the second switch 320 from open state to closed state, for example). For example, the door may be unlocked by the second interlock device 334 (when the one or more first conditions are met) such that the door can be opened and/or the manual switching unit of the second circuit breaker 318 can be accessed. Alternatively and/or additionally, when the first busway system is in the first state and the one or more first conditions are met, the second interlock device 334 may be controlled (by the interlock control system 330, for example) to not lock the manual switching unit of the second circuit breaker 318 in a current position of the manual switching unit such that the manual switching unit is able to be changed from the current position (e.g., OFF position, of the manual switching unit, associated with open state of the second switch 320) to another position (e.g., ON position, of the manual switching unit, associated with closed state of the second switch 320). Alternatively and/or additionally, when the first busway system is in the first state and the one or more first conditions are met, the second interlock device 334 may be controlled (by the interlock control system 330, for example) to permit the control device of the second circuit breaker 318 to change the state of the second switch 320 and/or the second circuit breaker 318 (from open state to closed state, for example). The first busway system may transition from the first state to the second state upon the second switch 320 being transferred from open state to closed state. When the first busway system is in the second state, the first busway system may transition from the second state to the third state upon the first switch 324 being transferred from closed state to open state. In some examples, when the first busway system is in the second state, the first interlock device 336 may be controlled (by the interlock control system 330, for example) to allow access to operate the manual switching unit of the first circuit breaker 322 such that the first switch 324 can be transferred (using the manual switching unit of the first circuit breaker 322, for example) from closed state to open state. Alternatively and/or additionally, when the first busway system is in the second state, the first interlock device 336 may be controlled (by the interlock control system 330, for example) to permit the control device of the first circuit breaker 322 to change the state of the first switch 324 (from closed state to open state, for example).

In an example, when the first busway system is in the first state and a condition of the one or more first conditions is not met, the second interlock device 334 may be controlled (by the interlock control system 330, for example) to prevent the state of the second switch 320 from being changed (from open state to closed state). For example, when the first busway system is in the first state and a condition of the one or more first conditions is not met, the second interlock device 334 may be controlled (by the interlock control system 330, for example) to block access to operate the manual switching unit of the second circuit breaker 318. For example, the second interlock device 334 may prevent the door (to the space in which the second circuit breaker 318 and/or the manual switching unit are disposed) from being opened (such that the manual switching unit cannot be operated to transfer the second switch 320 from open state to closed state, for example). For example, the door may be locked by the second interlock device 334 (when a condition of the one or more first conditions is not met) such that the door cannot be opened and/or the manual switching unit of the second circuit breaker 318 cannot be accessed. Alternatively and/or additionally, when the first busway system is in the first state and a condition of the one or more first conditions is not met, the second interlock device 334 may be controlled (by the interlock control system 330, for example) to lock the manual switching unit of the second circuit breaker 318 in a current position of the manual switching unit such that the manual switching unit is not able to be changed from the current position (e.g., OFF position, of the manual switching unit, associated with open state of the second switch 320) to another position (e.g., ON position, of the manual switching unit, associated with closed state of the second switch 320). Alternatively and/or additionally, when the first busway system is in the first state and a condition of the one or more first conditions is not met, the second interlock device 334 may be controlled (by the interlock control system 330, for example) to not permit the control device of the second circuit breaker 318 to change the state of the second switch 320 and/or the second circuit breaker 318 (from open state to closed state, for example).

In an example, when the first busway system is in the third state and the one or more second conditions are met, the first interlock device 336 may be controlled (by the interlock control system 330, for example) to allow the first switch 324 to be transferred from open state to closed state. For example, when the first busway system is in the third state and the one or more second conditions are met, the first interlock device 336 may be controlled (by the interlock control system 330, for example) to allow access to operate the manual switching unit of the first circuit breaker 322. For example, the first interlock device 336 may allow the door (to the space in which the first circuit breaker 322 and/or the manual switching unit are disposed) to be opened (such that the manual switching unit can be operated to transfer the first switch 324 from open state to closed state, for example). For example, the door may be unlocked by the first interlock device 336 (when the one or more second conditions are met) such that the door can be opened and/or the manual switching unit of the first circuit breaker 322 can be accessed. Alternatively and/or additionally, when the first busway system is in the third state and the one or more second conditions are met, the first interlock device 336 may be controlled (by the interlock control system 330, for example) to not lock the manual switching unit of the first circuit breaker 322 in a current position of the manual switching unit such that the manual switching unit is able to be changed from the current position (e.g., OFF position, of the manual switching unit, associated with open state of the first switch 324) to another position (e.g., ON position, of the manual switching unit, associated with closed state of the first switch 324). Alternatively and/or additionally, when the first busway system is in the third state and the one or more second conditions are met, the first interlock device 336 may be controlled (by the interlock control system 330, for example) to permit the control device of the first circuit breaker 322 to change the state of the first switch 324 and/or the first circuit breaker 322 (from open state to closed state, for example). The first busway system may transition from the third state to the second state upon the first switch 324 being transferred from open state to closed state. When the first busway system is in the second state, the first busway system may transition from the second state to the first state upon the second switch 320 being transferred from closed state to open state. In some examples, when the first busway system is in the second state, the second interlock device 334 may be controlled (by the interlock control system 330, for example) to allow access to operate the manual switching unit of the second circuit breaker 318 such that the second switch 320 can be transferred (using the manual switching unit of the second circuit breaker 318, for example) from closed state to open state. Alternatively and/or additionally, when the first busway system is in the second state, the second interlock device 334 may be controlled (by the interlock control system 330, for example) to permit the control device of the second circuit breaker 318 to change the state of the second switch 320 (from closed state to open state, for example).

In an example, when the first busway system is in the third state and a condition of the one or more second conditions is not met, the first interlock device 336 may be controlled (by the interlock control system 330, for example) to prevent the state of the first switch 324 from being changed (from open state to closed state). For example, when the first busway system is in the third state and a condition of the one or more second conditions is not met, the first interlock device 336 may be controlled (by the interlock control system 330, for example) to block access to operate the manual switching unit of the first circuit breaker 322. For example, the first interlock device 336 may prevent the door (to the space in which the first circuit breaker 322 and/or the manual switching unit are disposed) from being opened (such that the manual switching unit cannot be operated to transfer the first switch 324 from open state to closed state, for example). For example, the door may be locked by the first interlock device 336 (when a condition of the one or more second conditions is not met) such that the door cannot be opened and/or the manual switching unit of the first circuit breaker 322 cannot be accessed. Alternatively and/or additionally, when the first busway system is in the third state and a condition of the one or more second conditions is not met, the first interlock device 336 may be controlled (by the interlock control system 330, for example) to lock the manual switching unit of the first circuit breaker 322 in a current position of the manual switching unit such that the manual switching unit is not able to be changed from the current position (e.g., OFF position, of the manual switching unit, associated with open state of the first switch 324) to another position (e.g., ON position, of the manual switching unit, associated with closed state of the first switch 324). Alternatively and/or additionally, when the first busway system is in the third state and a condition of the one or more second conditions is not met, the first interlock device 336 may be controlled (by the interlock control system 330, for example) to not permit the control device of the first circuit breaker 322 to change the state of the first switch 324 and/or the first circuit breaker 322 (from open state to closed state, for example).

In some examples, a transition process between states of the first busway system (e.g., a transition process from the first state of the first busway system to the third state and/or a transition process from the third state of the first busway system to the third state) may be automated (rather than and/or in addition to a manual process, for example). For example, the transition process may be performed using one or more control devices, such as the control device (e.g., the electric control device), of the first circuit breaker 322, that is configured to control the state of the first switch 324 and/or the first circuit breaker 322 and/or the control device (e.g., the electric control device), of the second circuit breaker 318, that is configured to control the state of the second switch 320 and/or the second circuit breaker 318.

In an example, when the first busway system is in the first state, the second interlock device 334 may permit the control device of the second circuit breaker 318 to transfer the second switch 320 from open state to closed state in response to the one or more first conditions being met. For example, when the first busway system is in the first state and the one or more first conditions are met, the control device of the second circuit breaker 318 may transfer the second switch 320 from open state to closed state in response to a trigger (e.g., at least one of a received signal, an automatic trigger corresponding to one or more conditions being met, etc.), wherein the first busway system transitions from the first state to the second state upon transfer of the second switch 320 from open state to closed state. When the first busway system is in the second state, the control device of the first circuit breaker 322 may transfer the first switch 324 from closed state to open state (in response to the first busway system transitioning from the first state to the second state, for example), wherein the first busway system transitions from the second state to the third state upon transfer of the first switch 324 from closed state to open state (e.g., the first interlock device 336 may permit the control device of the first circuit breaker 322 to transfer the first switch 324 from closed state to open state when the first busway system is in the second state).

In an example, when the first busway system is in the third state, the first interlock device 336 may permit the control device of the first circuit breaker 322 to transfer the first switch 324 from open state to closed state in response to the one or more second conditions being met. For example, when the first busway system is in the third state and the one or more second conditions are met, the control device of the first circuit breaker 322 may transfer the first switch 324 from open state to closed state in response to a trigger (e.g., at least one of a received signal, an automatic trigger corresponding to one or more conditions being met, etc.), wherein the first busway system transitions from the third state to the second state upon transfer of the first switch 324 from open state to closed state. When the first busway system is in the second state, the control device of the second circuit breaker 318 may transfer the second switch 320 from closed state to open state (in response to the first busway system transitioning from the third state to the second state, for example), wherein the first busway system transitions from the second state to the first state upon transfer of the second switch 320 from closed state to open state (e.g., the second interlock device 334 may permit the control device of the second circuit breaker 318 to transfer the second switch 320 from closed state to open state when the first busway system is in the second state).

In some examples, one or more of the techniques and/or configurations discussed herein with respect to at least one of the first set of interlock devices (e.g., the first interlock device 336 and/or the second interlock device 334), operation of the first set of interlock devices, transition between states of the first busway system, configurations (e.g., configurations of the first set of interlock devices, the first switch 324 and/or the second switch 320) in different states of the first busway system, etc. may be applied to at least one of the second set of interlock devices (e.g., the third interlock device 350 and/or the fourth interlock device 332), operation of the second set of interlock devices, transition between states of the second busway system, configurations (e.g., configurations of the second set of interlock devices, the third switch 328 and/or the fourth switch 316) in different states of the second busway system, etc.

In some examples, one or more interlock devices of the one or more sets of interlock devices may be disposed in (e.g., affixed to and/or embedded in) the first power distribution component 108. Alternatively and/or additionally, one or more interlock devices of the one or more sets of interlock devices may be disposed in (e.g., affixed to and/or embedded in) the second power distribution component 106. In an example (e.g., shown in FIG. 3), the first interlock device 336, the third interlock device 350, the first circuit breaker 322 and/or the third circuit breaker 326 may be disposed in (e.g., affixed to and/or embedded in) the first power distribution component 108 and/or the second interlock device 334, the fourth interlock device 332, the second circuit breaker 318 and/or the fourth circuit breaker 314 may be disposed in (e.g., affixed to and/or embedded in) the second power distribution component 106.

Figure 4:
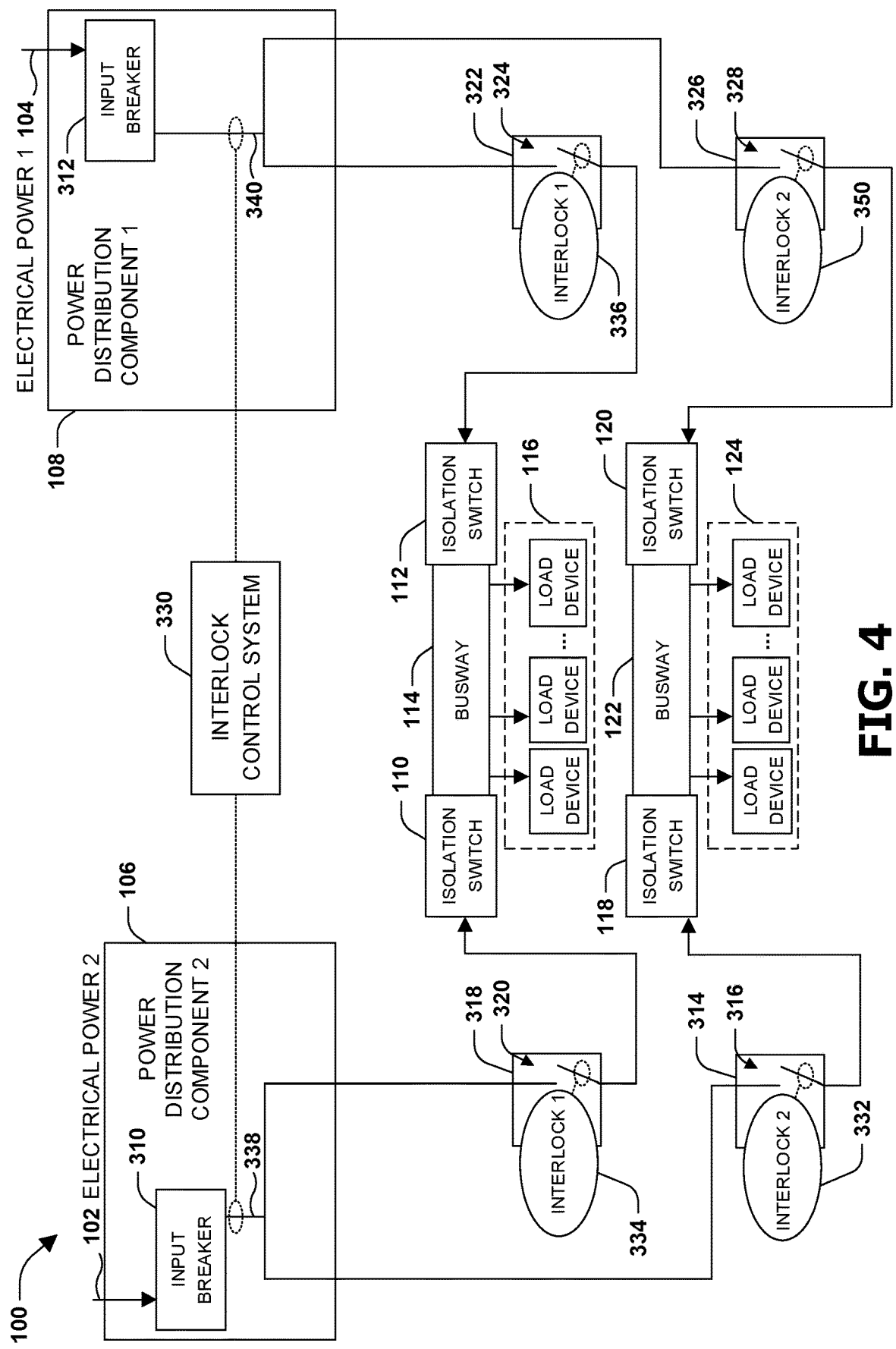
FIG. 4 is a component block diagram illustrating an example embodiment of an electrical distribution system.

In some examples, one or more interlock devices of the one or more sets of interlock devices may be outside the first power distribution component 108 and/or the second power distribution component 106. An example is shown in FIG. 4. In an example (e.g., shown in FIG. 4), the first interlock device 336, the third interlock device 350, the first circuit breaker 322 and/or the third circuit breaker 326 may be outside the first power distribution component 108 and/or the second interlock device 334, the fourth interlock device 332, the second circuit breaker 318 and/or the fourth circuit breaker 314 may be outside the second power distribution component 106.

Figure 5A:
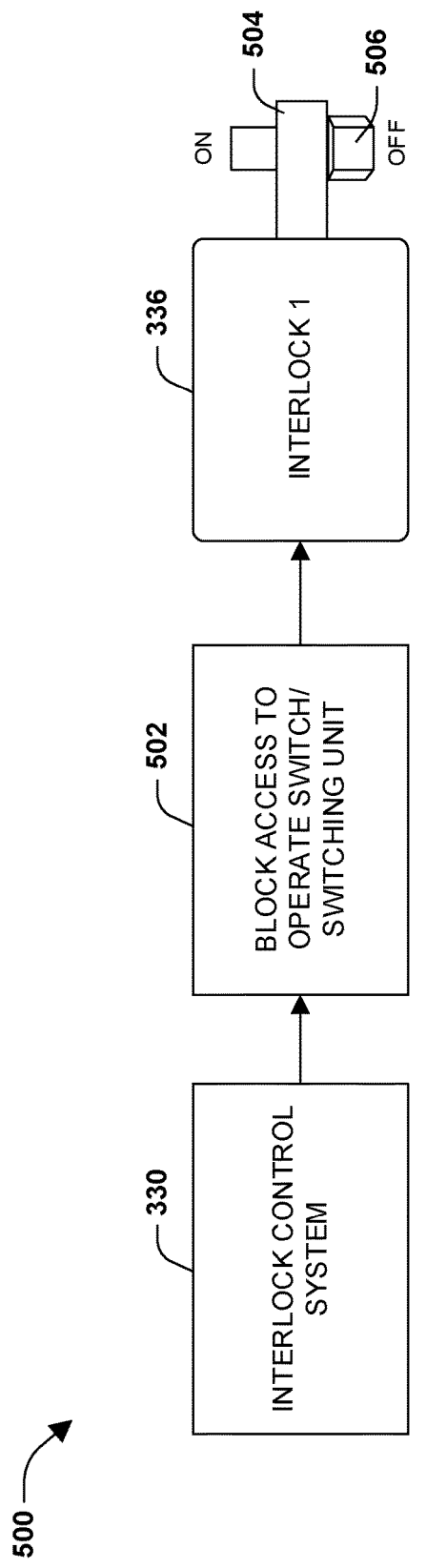
FIG. 5A is a component block diagram illustrating an example scenario in which an interlock device prevents a state of a switch from being changed.
Figure 5B:
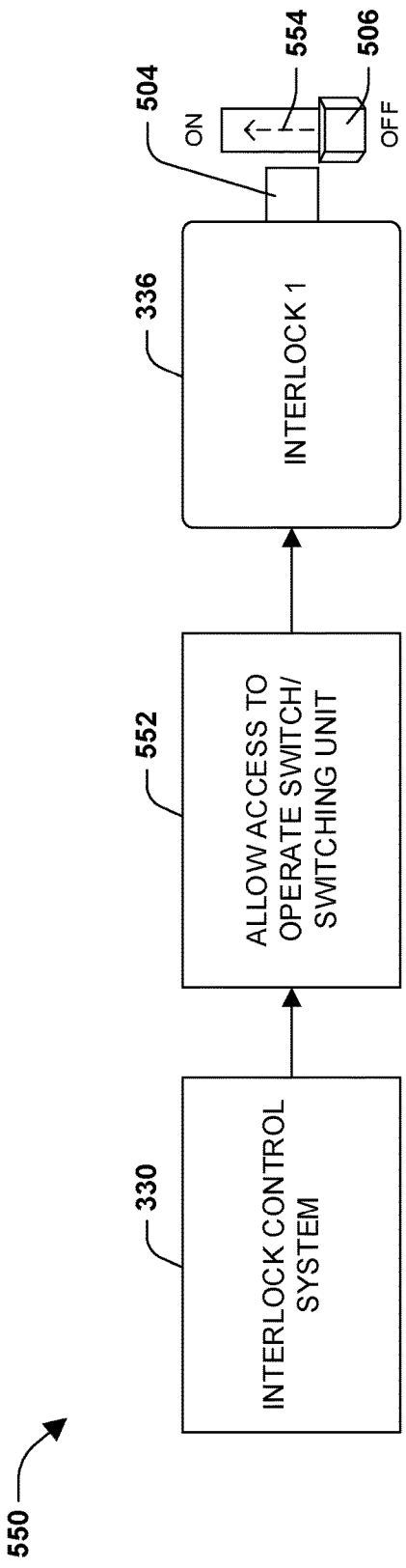
FIG. 5B is a component block diagram illustrating an example scenario in which an interlock device allows a state of a switch to be changed.

An example embodiment of an interlock device is illustrated in FIGS. 5A-5B. Although FIGS. 5A-5B are shown and described with respect to the first interlock device 336, it may be appreciated that one or more of the techniques shown and/or described with respect to FIGS. 5A-5B may be applicable to other interlock devices of the one or more sets of interlock devices of the interlock system 126, such as the second interlock device 334, the third interlock device 350 and/or the fourth interlock device 332.

A first example scenario 500 associated with the first interlock device 336 is shown in FIG. 5A. In the first example scenario 500, the interlock control system 330 may control the first interlock device 336 to prevent the state of the first switch 324 (not shown) from being changed (from open state to closed state, for example). In the first example scenario 500, the first busway system may be in the third state (in which the first switch 324 is in open state and the second switch 320 is in closed state, for example). In an example, the interlock control system 330 may transmit, to the first interlock device 336, a signal 502. The signal 502 may instruct the first interlock device 336 to block access to operate the first switch 324 and/or the manual switching unit (shown with reference number 506) of the first circuit breaker 322. For example, the interlock control system 330 may control the first interlock device 336 to block access to operate the first switch 324 and/or the manual switching unit 506 of the first circuit breaker 322 in response to a condition of the one or more second conditions not being met. The first interlock device 336 may block access to operate the first switch 324 and/or the manual switching unit 506 by locking the manual switching unit 506 in a first position (e.g., OFF position associated with open state of the first switch 324) using a locking mechanism 504 (e.g., a bolt) that is positioned in a path of motion of the manual switching unit 506 (e.g., the locking mechanism 504 may be extended into the path of motion of the manual switching unit 506 using an actuator of the first interlock device 336).

A second example scenario 550 associated with the first interlock device 336 is shown in FIG. 5B. In the second example scenario 550, the interlock control system 330 may control the first interlock device 336 to allow the state of the first switch 324 (not shown) to be changed (from open state to closed state, for example). In the second example scenario 550, the first busway system may be in the third state. In an example, the interlock control system 330 may transmit, to the first interlock device 336, a signal 552. The signal 552 may instruct the first interlock device 336 to allow access to operate the first switch 324 and/or the manual switching unit 506 of the first circuit breaker 322. For example, the interlock control system 330 may control the first interlock device 336 to allow access to operate the first switch 324 and/or the manual switching unit 506 of the first circuit breaker 322 in response to the one or more second conditions being met. The first interlock device 336 may allow access to operate the first switch 324 and/or the manual switching unit 506 by unlocking the manual switching unit 506, such as by retracting the locking mechanism 504 from the path of motion (shown with reference number 554) of the manual switching unit 506 (e.g., the locking mechanism 504 may be retracted using an actuator of the first interlock device 336). Accordingly, when the manual switching unit 506 is unlocked, the manual switching unit 506 may be switched (by a user, such as an operator) from the first position (e.g., the OFF position) to a second position (e.g., ON position associated with closed state of the first switch 324). Upon the manual switching unit 506 being switched from the first position to the second position, the first switch 324 may transfer from open state to closed state and the first busway system may transition from the third state to the second state (in which the first power distribution component 108 and the second power distribution component 106 supply electrical power to the first busway system, for example).

In some examples, the interlock system 126 comprises a key interlock system. In an example, a set of interlock devices of the one or more sets of interlock devices of the interlock system 126 (and/or each set of interlock devices of the one or more sets of interlock devices of the interlock system 126) comprises key interlock devices and/or a key release unit (e.g., a trapped key release unit, such as a solenoid key release unit (SKRU) or other type of trapped key release unit) associated with the key interlock devices.

Figure 6:
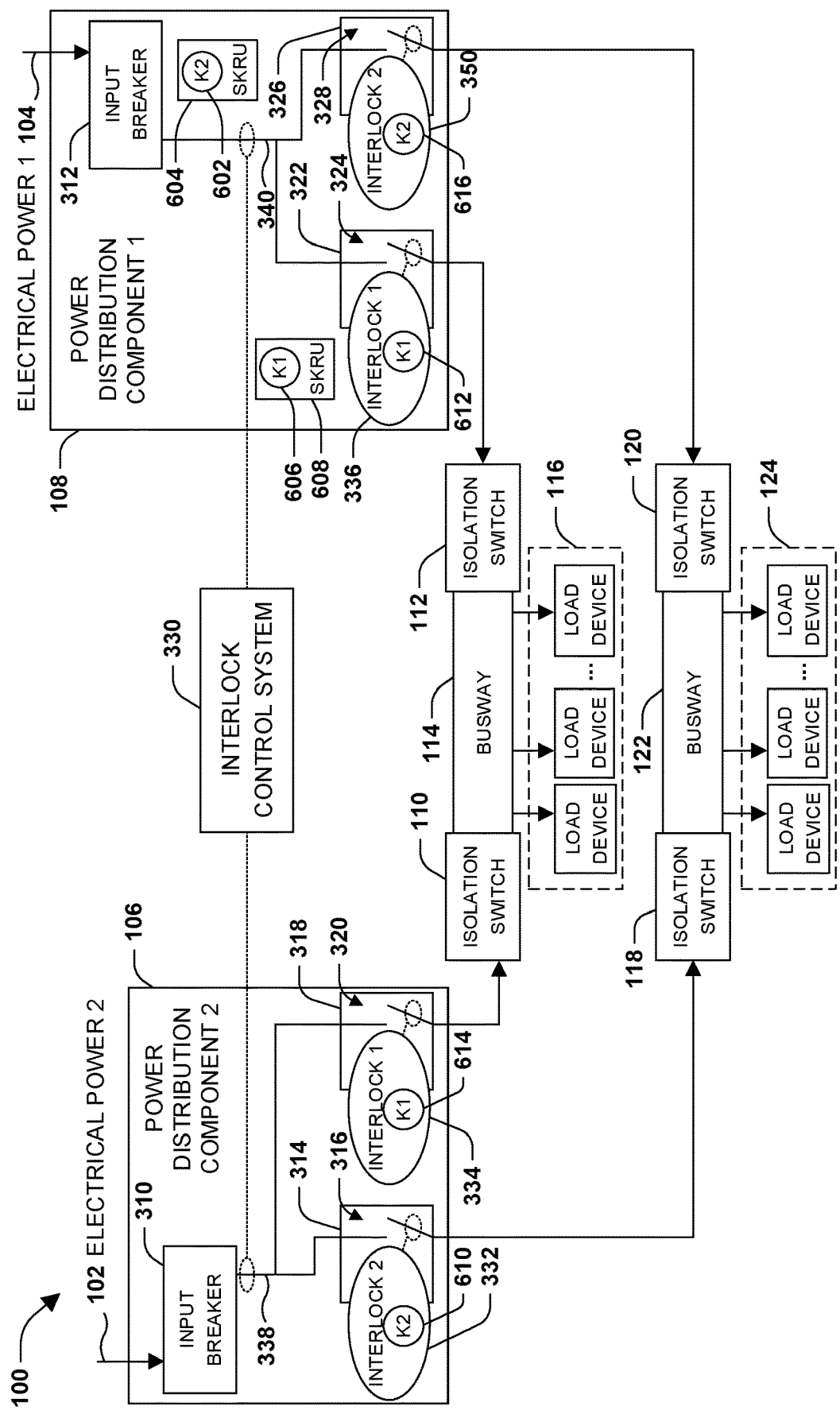
FIG. 6 is a component block diagram illustrating an example embodiment of an electrical distribution system.

An example embodiment of the electrical distribution system 100 in which the interlock system 126 comprises a key interlock system is shown in FIG. 6.

The first set of interlock devices may comprise the first interlock device 336 (e.g., a first key interlock device), the second interlock device 334 (e.g., a second key interlock device) and/or a first key release unit 608 (e.g., a first trapped key release unit, such as a SKRU or other type of trapped key release unit) associated with the first interlock device 336 and/or the second interlock device 334. The first key release unit 608 may be configured to retain a first key associated with the first interlock device 336 and/or the second interlock device 334. The first key may be configured to operate the first interlock device 336 and/or the second interlock device 334. For example, the first interlock device 336 may comprise a first cylinder 612 and the second interlock device 334 may comprise a second cylinder 614, wherein the first cylinder 612 and the second cylinder 614 may be keyed alike such that the first key can operate the first interlock device 336 and the second interlock device 334 (e.g., the first key may be inserted into and/or rotated within the first cylinder 612 and the first key may be inserted into and/or rotated within the second cylinder 614). In some examples, the first key release unit 608 may comprise a third cylinder 606 that is keyed for the first key (such that the first key release unit 608 is able to retain, capture and/or release the first key). In some examples, the first key may be a key of a plurality of keys (e.g., "K1" keys configured for "K1" cylinders shown in FIG. 6), wherein each key of the plurality of keys is configured to operate the first interlock device 336, configured to operate the second interlock device 334 and/or configured to be retained in and/or released by the first key release unit 608 (e.g., the plurality of keys may be duplicate keys). In an example, the plurality of keys comprises two keys (e.g., two duplicate keys) to provide for two-key/three-cylinder operation of the first set of interlock devices of the interlock system 126. For example, the plurality of keys comprises the first key and a second key (e.g., the first key and the second key are duplicates).

In an example, the first key release unit 608 may retain the first key (e.g., the first key may be held by the first key release unit 608, such as held within the third cylinder 606). In response to the one or more first conditions and/or the one or more second conditions being met, the first key release unit 608 may allow removal of the first key from the first key release unit 608. For example, when the one or more first conditions and/or the one or more second conditions are met, the first key release unit 608 may be in a key removal allowance state in which the first key release unit 608 allows removal of the first key from the first key release unit 608 (such that the first key can be manually removed from the first key release unit 608, for example). In an example, when the first key release unit 608 is in the key removal allowance state, the first key may be removed (e.g., removed by a user, such as an operator) from the first key release unit 608 by way of the first key being rotated (e.g., rotated at least one of 90 degrees, 180 degrees, etc.) and/or being manually extracted from the third cylinder 606 (after the first key is rotated, for example). In response to a condition of the one or more first conditions and/or a condition of the one or more second conditions not being met, the first key release unit 608 may inhibit removal of the key from the first key release unit 608. For example, when a condition of the one or more first conditions and/or a condition of the one or more second conditions are not met, the first key release unit 608 may be in a key capture state in which the first key release unit 608 inhibits removal of the first key from the first key release unit 608 (e.g., the first key is captured and/or held captive in the first key release unit 608 when the first key release unit 608 is in the key capture state). In an example, the first key release unit 608 may inhibit removal of the first key using a solenoid (and/or other mechanism) of the first key release unit 608.

In some examples, upon operation of a key of the plurality of keys with the first interlock device 336, the first interlock device 336 is configured to allow access to operate the first switch 324 and/or the manual switching unit 506 of the first circuit breaker 322. The operation of the key (e.g., the first key or the second key) with the first interlock device 336 may correspond to insertion of the key into the first cylinder 612 of the first interlock device 336 and/or rotation (e.g., at least one of 90-degree rotation, 180-degree rotation, etc.) of the key. For example, the operation of the key with the first interlock device 336 may switch the first interlock device 336 from a locked state to an unlocked state. In an example, the operation of the key with the first interlock device 336 may unlock (and/or open) the door to the space in which the first circuit breaker 322 and/or the manual switching unit 506 are disposed. Alternatively and/or additionally, the operation of the key with the first interlock device 336 may unlock the manual switching unit 506 of the first circuit breaker 322 such that the manual switching unit 506 is able to be changed from a current position (e.g., OFF position associated with open state of the first switch 324) to another position (e.g., ON position associated with closed state of the first switch 324).

In some examples, upon operation of a key of the plurality of keys with the second interlock device 334, the second interlock device 334 is configured to allow access to operate the second switch 320 and/or the manual switching unit of the second circuit breaker 318. The operation of the key (e.g., the first key or the second key) with the second interlock device 334 may correspond to insertion of the key into the second cylinder 614 of the second interlock device 334 and/or rotation (e.g., at least one of 90-degree rotation, 180-degree rotation, etc.) of the key. For example, the operation of the key with the second interlock device 334 may switch the second interlock device 334 from a locked state to an unlocked state. In an example, the operation of the key with the second interlock device 334 may unlock (and/or open) the door to the space in which the second circuit breaker 318 and/or the manual switching unit of the second circuit breaker 318 are disposed. Alternatively and/or additionally, the operation of the key with the second interlock device 334 may unlock the manual switching unit of the second circuit breaker 318 such that the manual switching unit is able to be changed from a current position (e.g., OFF position associated with open state of the second switch 320) to another position (e.g., ON position associated with closed state of the second switch 320).

In some examples, when the first busway system is in the first state (in which the first switch 324 is in closed state and the second switch 320 is in open state, for example), the first key may be held in the first key release unit 608 (e.g., in the third cylinder 606 of the first key release unit 608) and/or the second key may be held in the first interlock device 336 (e.g., in the first cylinder 612 of the first interlock device 336) while the first switch 324 is in closed state. In order to transfer the first busway system from the first state to the second state, the first key may be removed from the first key release unit 608 and/or used to operate the second interlock device 334. When the one or more first conditions are met, the first key release unit 608 may be controlled (by the interlock control system 330, for example) to be in the key removal allowance state in which the first key release unit 608 allows removal of the first key from the first key release unit 608. A user (e.g., an operator) may extract the first key from the first key release unit 608, and/or use the first key to operate the second interlock device 334 (e.g., the first key may be inserted into the second interlock device 334 and/or rotated). Upon operation of the first key with the second interlock device 334 (e.g., upon rotation of the first key in the second cylinder 614 of the second interlock device 334), the second interlock device 334 may allow access to operate the second switch 320 and/or the manual switching unit of the second circuit breaker 318. The first busway system may transition from the first state to the second state upon the second switch 320 being transferred from open state to closed state. In some examples, when the first busway system is in the second state, the first switch 324 may be transferred (using the manual switching unit 506 of the first circuit breaker 322, for example) from closed state to open state (to transfer the first busway system from the second state to the third state) and/or the second key may be removed from the first interlock device 336 and/or inserted into the first key release unit 608, wherein the first key release unit 608 may retain the second key in the key capture state (e.g., the second key is captured and/or held captive in the first key release unit 608 when the first key release unit 608 is in the key capture state).

In some examples, when the first busway system is in the third state (in which the first switch 324 is in open state and the second switch 320 is in closed state, for example), the first key may be held in the first key release unit 608 (e.g., in the third cylinder 606 of the first key release unit 608) and/or the second key may be held in the second interlock device 334 (e.g., in the second cylinder 614 of the second interlock device 334) while the second switch 320 is in closed state. In order to transfer the first busway system from the third state to the second state, the first key may be removed from the first key release unit 608 and/or used to operate the first interlock device 336. When the one or more second conditions are met, the first key release unit 608 may be controlled (by the interlock control system 330, for example) to be in the key removal allowance state in which the first key release unit 608 allows removal of the first key from the first key release unit 608. A user (e.g., an operator) may extract the first key from the first key release unit 608, and/or use the first key to operate the first interlock device 336 (e.g., the first key may be inserted into the first interlock device 336 and/or rotated). Upon operation of the first key with the first interlock device 336 (e.g., upon rotation of the first key in the first cylinder 612 of the first interlock device 336), the first interlock device 336 may allow access to operate the first switch 324 and/or the manual switching unit 506 of the first circuit breaker 322. The first busway system may transition from the third state to the second state upon the first switch 324 being transferred from open state to closed state. In some examples, when the first busway system is in the second state, the second switch 320 may be transferred (using the manual switching unit of the second circuit breaker 318, for example) from closed state to open state (to transfer the first busway system from the second state to the third state) and/or the second key may be removed from the second interlock device 334 and/or inserted into the first key release unit 608, wherein the first key release unit 608 may retain the second key in the key capture state (e.g., the second key is captured and/or held captive in the first key release unit 608 when the first key release unit 608 is in the key capture state).

An example embodiment of a key interlock device is illustrated in FIGS. 7A-7B. Although FIGS. 7A-7B are shown and described with respect to the first interlock device 336, it may be appreciated that one or more of the techniques shown and/or described with respect to FIGS. 7A-7B may be applicable to other interlock devices of the one or more sets of interlock devices of the interlock system 126, such as the second interlock device 334, the third interlock device 350 and/or the fourth interlock device 332.

A first example scenario 700 associated with the first interlock device 336 is shown in FIG. 7A. In the first example scenario 700, the first interlock device 336 prevents the state of the first switch 324 (not shown) from being changed (from open state to closed state). In the first example scenario 700, the first busway system may be in the third state (in which the first switch 324 is in open state and the second switch 320 is in closed state, for example). The first interlock device 336 may block access to operate the first switch 324 and/or the manual switching unit 506 by locking the manual switching unit 506 in a first position (e.g., OFF position associated with open state of the first switch 324) using a locking mechanism 704 (e.g., a bolt, such as a key actuated bolt) that is positioned in a path of motion of the manual switching unit 506.

A second example scenario 750 associated with the first interlock device 336 is shown in FIG. 7B. In the second example scenario 750, the first interlock device 336 allows the state of the first switch 324 (not shown) to be changed (from open state to closed state, for example). The first interlock device 336 may allow access to operate the first switch 324 and/or the manual switching unit 506 by unlocking the manual switching unit 506, such as by retracting the locking mechanism 704 from the path of motion (shown with reference number 754) of the manual switching unit 506. The locking mechanism 704 may be retracted from the path of motion of the manual switching unit 506 by insertion of a key 752 (e.g., the first key or the second key) into a keyway 702 (shown in FIG. 7A) of the first cylinder 612 and/or rotation (e.g., at least one of 90-degree rotation, 180-degree rotation, etc.) of the key 752 within the keyway 702. Accordingly, when the manual switching unit 506 is unlocked, the manual switching unit 506 may be switched (by a user, such as an operator) from the first position (e.g., the OFF position) to a second position (e.g., ON position associated with closed state of the first switch 324). Upon the manual switching unit 506 being switched from the first position to the second position, the first switch 324 may transfer from open state to closed state and the first busway system may transition from the third state to the second state (in which the first power distribution component 108 and the second power distribution component 106 supply electrical power to the first busway system, for example).

The second set of interlock devices may comprise the third interlock device 350 (e.g., a third key interlock device), the fourth interlock device 332 (e.g., a fourth key interlock device) and/or a second key release unit 604 (e.g., a second trapped key release unit, such as a SKRU or other type of trapped key release unit) associated with the third interlock device 350 and/or the fourth interlock device 332. The second key release unit 604 may be configured to retain a third key associated with the third interlock device 350 and/or the fourth interlock device 332. The third key may be configured to operate the third interlock device 350 and/or the fourth interlock device 332. For example, the third interlock device 350 may comprise a fourth cylinder 616 and the fourth interlock device 332 may comprise a fifth cylinder 610, wherein the fourth cylinder 616 and the fifth cylinder 610 may be keyed alike such that the third key can operate the third interlock device 350 and the fourth interlock device 332 (e.g., the third key may be inserted into and/or rotated within the fourth cylinder 616 and the third key may be inserted into and/or rotated within the fifth cylinder 610). In some examples, the second key release unit 604 may comprise a sixth cylinder 602 that is keyed for the third key (such that the second key release unit 604 is able to retain, capture and/or release the third key). In some examples, the third key may be a key of a second plurality of keys (e.g., "K2" keys configured for "K2" cylinders shown in FIG. 6), wherein each key of the second plurality of keys is configured to operate the third interlock device 350, configured to operate the fourth interlock device 332 and/or configured to be retained in and/or released by the second key release unit 604 (e.g., the second plurality of keys may be duplicate keys). In an example, the second plurality of keys comprises two keys (e.g., two duplicate keys) to provide for two-key/three-cylinder operation of the second set of interlock devices of the interlock system 126. For example, the second plurality of keys comprises the third key and a fourth key (e.g., the third key and the fourth key are duplicates).

In some examples, one or more of the techniques and/or configurations discussed herein with respect to at least one of the first set of interlock devices (e.g., the first interlock device 336, the second interlock device 334 and/or the first key release unit 608), operation of the first set of interlock devices, transition between states of the first busway system, configurations (e.g., configurations of the first set of interlock devices, the first switch 324 and/or the second switch 320) in different states of the first busway system, etc. may be applied to at least one of the second set of interlock devices (e.g., the third interlock device 350, the fourth interlock device 332 and/or the second key release unit 604), operation of the second set of interlock devices, transition between states of the second busway system, configurations (e.g., configurations of the second set of interlock devices, the third switch 328 and/or the fourth switch 316) in different states of the second busway system, etc.

In some examples, one or more key release units (e.g., the first key release unit 608 and/or the second key release unit 604) of the one or more sets of interlock devices may be disposed in (e.g., affixed to and/or embedded in) the first power distribution component 108 (e.g., shown in FIG. 6) or the second power distribution component 106. Alternatively and/or additionally, one or more key release units (e.g., the first key release unit 608 and/or the second key release unit 604) of the one or more sets of interlock devices may be outside the first power distribution component 108 and/or the second power distribution component 106.

In some examples, one or more transition processes may be performed using one or more of the techniques provided herein to transition from the first state of the one or more busway systems of the electrical distribution system 100 to the third state of the one or more busway systems. For example, the one or more busway systems may comprise one, some and/or all busway systems that the first power distribution component 108 powers prior to the one or more transition processes (e.g., when the one or more busway systems are in the first state). Accordingly, when (and/or after) the one or more transition processes are complete (e.g., when the one or more busway systems are in the third state), the first power distribution component 108 may be isolated from the one or more busway systems. In some examples, one or more maintenance operations may be performed on one or more components (e.g., one or more components that are upstream of the one or more busway systems) when the one or more busway systems are in the third state. In an example, the one or more components may comprise one or more components of the first power distribution component 108, one or more components that are connected to the first power distribution component 108, one or more components that are configured to supply electrical power to the first power distribution component 108, etc. For example, the one or more components may be isolated from electrical power of the one or more busway systems (e.g., electrical power supplied to the one or more busway systems by the second power distribution component 106) by one or more switches (that are in open state) that are connected to the one or more busway systems and/or connected to the power distribution component 108 (e.g., the one or more switches may comprise at least one of the first switch 324 connected to the first busway system of the one or more busway systems, the third switch 328 connected to the second busway system of the one or more busway systems, etc.). A power source of the first power distribution component 108 may be turned off and/or isolated from the one or more components such that the one or more components are de-energized (without disrupting electrical power supplied to the one or more busway systems since the one or more busway systems are powered by the second power distribution component 106, for example). Accordingly, the one or more maintenance operations may be performed safely on the one or more components while the one or more components are de-energized (without risk of bodily harm and/or risk of damage to the one or more components, for example). Alternatively and/or additionally, one or more isolation switches (e.g., the first isolation switch 112 and/or the third isolation switch 120), of the one or more busway systems, that are connected to the one or more switches may be transferred from closed state to open state such that the first power distribution component 108 and/or circuitry connected between the one or more isolation switches and the one or more switches are isolated from electrical power of one or more busways (e.g., the first busway 114 and/or the second busway 122). Accordingly, the circuitry and/or the first power distribution component 108 may be accessed and/or interacted with without risk of bodily harm and/or risk of damage to the circuitry and/or the first power distribution component 108, for example.

In some examples, the one or more busway systems may transition from the first state to a power failure state (upon power failure of the first power distribution component 108 and/or a power source of the first power distribution component 108, for example). For example, the power failure state may correspond to a state in which sufficient electrical power is not supplied to the first power distribution component 108 and/or the first power distribution component 108 does not supply sufficient electrical power to the one or more busway systems. Alternatively and/or additionally, the power failure state may correspond to a state in which no electrical power is supplied to the first power distribution component 108 and/or the first power distribution component 108 does not supply any electrical power to the one or more busway systems. In some examples, in response to the one or more busway systems entering the power failure state, the interlock system 126 may allow the one or more busway systems to transition to the third state (in which the second power distribution component 106 supplies electrical power to the one or more busway systems, for example). In an example, the second interlock device 334 may allow access to operate the second switch 320 and/or the fourth interlock device 332 may allow access to operate the fourth switch 316. Accordingly, the manual switching unit of the second circuit breaker 318 can be operated (by a user, such as an operator, for example) to transfer the second switch 320 from open state to closed state and/or the manual switching unit of the fourth circuit breaker 314 can be operated to transfer the fourth switch 316 from open state to closed state. Alternatively and/or additionally, in an example in which the second interlock device 334 is a key interlock device and/or the fourth interlock device 332 is a key interlock device, a key (e.g., the first key or the second key) may be extracted (by the user, for example) from the first interlock device 336 and used to operate the second interlock device 334 to enable the second switch 320 to be transferred from open state to closed state and/or a key (e.g., the third key or the fourth key) may be extracted from the third interlock device 350 and used to operate the fourth interlock device 332 to enable the fourth switch 316 to be transferred from open state to closed state. Accordingly, in the event of power failure associated with the first power distribution component 108, the second power distribution component 106 may be used to supply electrical power to the one or more busway systems.

FIG. 8 illustrates an example embodiment of the electrical distribution system 100 in which the second power distribution component 106 (e.g., the reserve power distribution component) is connected to multiple sets of busway systems that are connected to (and/or powered by) multiple power distribution components (e.g., multiple primary power distribution components). For example, the second power distribution component 106 may be connected to a plurality of sets of busway systems comprising a first set of one or more busway systems 810 (e.g., the first set of one or more busway systems 810 may be connected to and/or powered by the first power distribution component 108), a second set of one or more busway systems 824 (e.g., the second set of one or more busway systems 824 may be connected to and/or powered by a third power distribution component 814), and/or a third set of one or more busway systems 832 (e.g., the third set of one or more busway systems 832 may be connected to and/or powered by a fourth power distribution component 816). In some examples, the interlock system 126 may comprise interlock devices that control whether transition between states of a set of busway systems of the plurality of sets of busway systems is allowed (using one or more of the techniques provided herein). In some examples, the first set of one or more busway systems 810 may transition from the first state (in which the first power distribution component 108 supplies electrical power to the first set of one or more busway systems 810, for example) to the third state (in which the second power distribution component 106 supplies electrical power to the first set of one or more busway systems 810, for example), wherein, when the first set of one or more busway systems 810 is in the third state, one or more maintenance operations may be performed on one or more components associated with the first power distribution component 108 (e.g., the one or more components may comprise one or more components of the first power distribution component 108, one or more components that are connected to the first power distribution component 108, one or more components that are configured to supply electrical power to the first power distribution component 108, etc.). In some examples, the second set of one or more busway systems 824 may transition from the first state (in which the third power distribution component 814 supplies electrical power to the second set of one or more busway systems 824, for example) to the third state (in which the second power distribution component 106 supplies electrical power to the second set of one or more busway systems 824, for example), wherein, when the second set of one or more busway systems 824 is in the third state, one or more maintenance operations may be performed on one or more components associated with the third power distribution component 814 (e.g., the one or more components may comprise one or more components of the third power distribution component 814, one or more components that are connected to the third power distribution component 814, one or more components that are configured to supply electrical power to the third power distribution component 814, etc.). In some examples, the third set of one or more busway systems 832 may transition from the first state (in which the fourth power distribution component 816 supplies electrical power to the third set of one or more busway systems 832, for example) to the third state (in which the second power distribution component 106 supplies electrical power to the third set of one or more busway systems 832, for example), wherein, when the third set of one or more busway systems 832 is in the third state, one or more maintenance operations may be performed on one or more components associated with the fourth power distribution component 816 (e.g., the one or more components may comprise one or more components of the fourth power distribution component 816, one or more components that are connected to the fourth power distribution component 816, one or more components that are configured to supply electrical power to the fourth power distribution component 816, etc.).

Implementation of at least some of the disclosed subject matter may lead to benefits including, but not limited to, concurrent maintainability of components of the electrical distribution system 100, reduced complexity for switching between using the first power distribution component 108 to power a busway and using the second power distribution component 106 to power the busway, closed transition (e.g., make before break) between states of a busway, etc.

In some examples, a bypass system (e.g., a single bypass system with a lower capacity than multiple power distribution components, such as multiple primary power distribution components) may comprise the second power distribution component 106. The bypass system may be used to provide a secondary power source to the multiple power distribution components (e.g., at least one of the first power distribution component 108, the third power distribution component 814, the fourth power distribution component 816, etc.) and/or to busway systems (e.g., at least one of the first set of one or more busway systems 810, the second set of one or more busway systems 824, the third set of one or more busway systems 832, etc.) connected to the multiple power distribution components. Enabling the bypass system (e.g., a single bypass system) to provide the secondary power source to the multiple power distribution components and/or to the busway systems may enable more efficient designs (e.g., as a result of enabling the single bypass system to provide a secondary power source to the multiple power distribution components and/or to the busway systems, thereby providing for less equipment and/or space as compared to using multiple bypass systems to provide secondary power sources to the multiple power distribution components).

Figure 9:
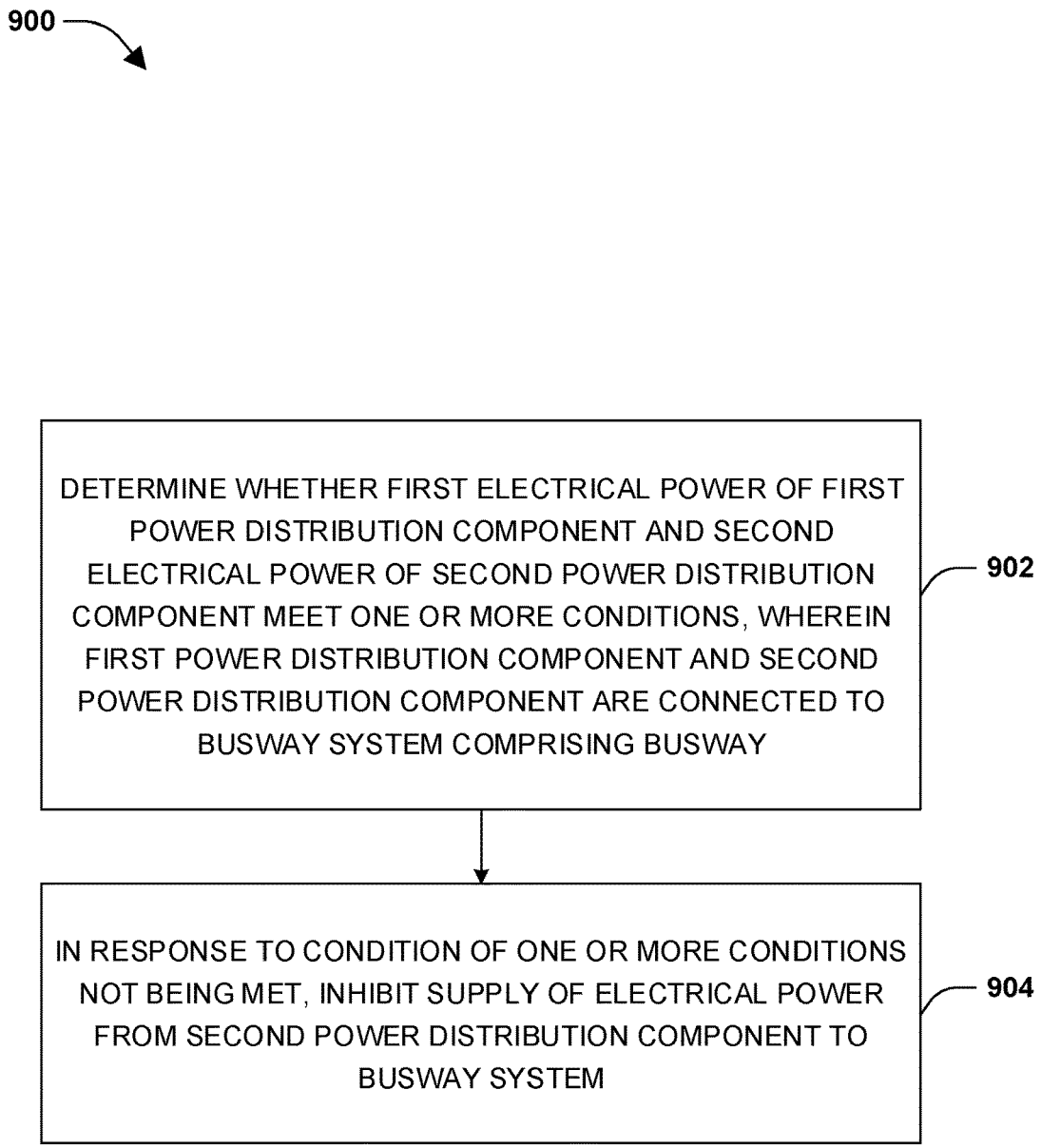
FIG. 9 is a flow chart illustrating an example method for controlling supply of electrical power to a busway system.

An example embodiment of controlling supply of electrical power to a busway system is illustrated by an example method 900 of FIG. 9. In some examples, one, some and/or all acts of the example method 900 may be performed by an interlock system (e.g., the interlock system 126). A first power distribution component and a second power distribution component may be connected to a busway system comprising a busway. At 902, whether first electrical power of the first power distribution component and second electrical power of the second power distribution component meet one or more conditions is determined. At 904, in response to a condition of the one or more conditions not being met, supply of electrical power from the second power distribution component to the busway system is inhibited.

In some examples, a first voltage of the first electrical power, a second voltage of the second electrical power, a first frequency of the first electrical power, a second frequency of the second electrical power, a first rotation of the first electrical power and/or a second rotation of the second electrical power may be measured using a measurement device. The one or more conditions may comprise a first condition that the first electrical power and the second electrical power are synchronized. Whether the first electrical power and the second electrical power meet the first condition may be determined based upon the first voltage, the second voltage, the first frequency, the second frequency, the first rotation and/or the second rotation.

In some examples, supply of electrical power from the second power distribution component to the busway system is inhibited by inhibiting a second switch from being transferred from an open state to a closed state. A first side of the second switch is connected to a circuit of the second power distribution component. A second side of the second switch is connected to the busway system.

In some examples, in response to the one or more conditions being met, the switch may be allowed to be transferred from an open state to a closed state.

In some examples, removal of a key from a key release unit may be allowed in response to the one or more conditions being met. Alternatively and/or additionally, removal of the key from the key release unit may be inhibited in response to a condition of the one or more conditions not being met. The key may be configured to operate a first key interlock device associated with a first switch and/or a second key interlock device associated with the second switch. A first side of the first switch may be connected to a second circuit of the first power distribution component. A second side of the first switch may be connected to the busway system.

In some examples, upon operation of the key with the first key interlock device, the first key interlock device is configured to allow access to operate the first switch. Alternatively and/or additionally, upon operation of the key with the second key interlock device, the second key interlock device may be configured to allow access to operate the switch.

In some examples, in response to the one or more conditions being met, access to operate the switch may be allowed using an interlock device. Alternatively and/or additionally, in response to a condition of the one or more conditions not being met, access to operate the switch may be blocked using the interlock device.

In some examples, a system (e.g., at least one of the interlock system 126, the interlock control system 330, etc.) is provided. The interlock system comprises a processor and memory comprising processor-executable instructions that when executed by the processor cause performance of operations, such as at least some of the example method 900 of FIG. 9 and/or one or more other operations provided herein, for example.

Figure 10:
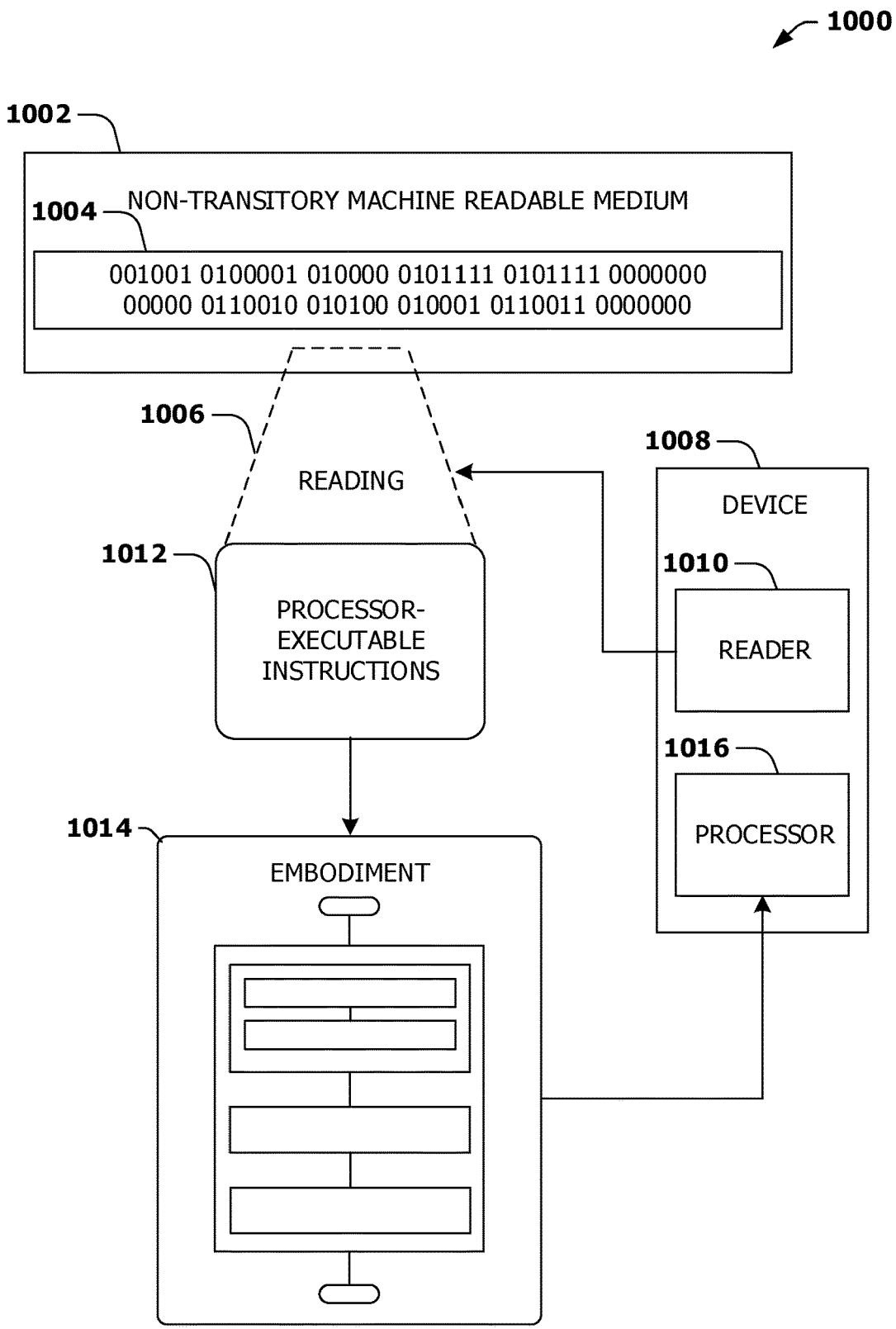
FIG. 10 is an illustration of a scenario featuring an example non-transitory machine readable medium in accordance with one or more of the provisions set forth herein.

FIG. 10 is an illustration of a scenario 1000 involving an example non-transitory machine readable medium 1002. The non-transitory machine readable medium 1002 may comprise processor-executable instructions 1012 that when executed by a processor 1016 cause performance (e.g., by the processor 1016) of at least some of the provisions herein (e.g., embodiment 1014). The non-transitory machine readable medium 1002 may comprise a memory semiconductor (e.g., a semiconductor utilizing static random access memory (SRAM), dynamic random access memory (DRAM), and/or synchronous dynamic random access memory (SDRAM) technologies), a platter of a hard disk drive, a flash memory device, or a magnetic or optical disc (such as a compact disc (CD), digital versatile disc (DVD), or floppy disk). The example non-transitory machine readable medium 1002 stores computer-readable data 1004 that, when subjected to reading 1006 by a reader 1010 of a device 1008 (e.g., a read head of a hard disk drive, or a read operation invoked on a solid-state storage device), express the processor-executable instructions 1012. In some embodiments, the processor-executable instructions 1012, when executed, cause performance of operations, such as at least some of the example method 900 of FIG. 9, for example. In some embodiments, the processor-executable instructions 1012 are configured to cause implementation of a system, such as at least some of the electrical distribution system 100, the interlock system 126 and/or the interlock control system 330, for example.

As used in this application, "component," "module," "system", "interface", and/or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Unless specified otherwise, "first," "second," and/or the like are not intended to imply a temporal aspect, a spatial aspect, an ordering, etc. Rather, such terms are merely used as identifiers, names, etc. for features, elements, items, etc. For example, a first object and a second object generally correspond to object A and object B or two different or two identical objects or the same object.

Moreover, "example" is used herein to mean serving as an instance, illustration, etc., and not necessarily as advantageous. As used herein, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B or both A and B. Furthermore, to the extent that "includes", "having", "has", "with", and/or variants thereof are used in either the detailed description or the claims, such terms are intended to be inclusive in a manner similar to the term "comprising".

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing at least some of the claims.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Various operations of embodiments are provided herein. In an embodiment, one or more of the operations described may constitute computer readable instructions stored on one or more computer and/or machine readable media, which if executed will cause the operations to be performed. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein. Also, it will be understood that not all operations are necessary in some embodiments.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. An electrical distribution system comprising:
   a first power distribution component connected to a first isolation switch of a busway system comprising a busway;
   a second power distribution component connected to a second isolation switch of the busway system; and
   an interlock system configured to:
      determine whether first electrical power of the first power distribution component and second electrical power of the second power distribution component meet one or more conditions;
      when the one or more conditions are met, allow supply of electrical power from the first power distribution component to the busway system via the first isolation switch and allow supply of electrical power from the second power distribution component to the busway system via the second isolation switch;
      in response to a condition of the one or more conditions not being met, inhibit supply of electrical power from the first power distribution component to the busway system via the first isolation switch; and
      in response to a second condition of the one or more conditions not being met, inhibit supply of electrical power from the second power distribution component to the busway system via the second isolation switch.

2. The electrical distribution system of claim 1, wherein:
   the interlock system comprises a measurement device configured to measure at least one of a first voltage of the first electrical power, a second voltage of the second electrical power, a first frequency of the first electrical power, a second frequency of the second electrical power, a first rotation of the first electrical power or a second rotation of the second electrical power;
   the one or more conditions comprise a first condition that the first electrical power and the second electrical power are synchronized; and
   the interlock system is configured to determine whether the first electrical power and the second electrical power meet the first condition based upon at least one of the first voltage, the second voltage, the first frequency, the second frequency, the first rotation or the second rotation.

3. The electrical distribution system of claim 1, comprising:
   a first switch and a second switch, wherein:
      a first side of the first switch is connected to a first circuit of the first power distribution component;
      a second side of the first switch is connected to the busway system;
      a first side of the second switch is connected to a second circuit of the second power distribution component; and
      a second side of the second switch is connected to the busway system.

4. The electrical distribution system of claim 3, wherein:
   in response to a condition of the one or more conditions not being met, the interlock system is configured to inhibit the second switch from being transferred from an open state to a closed state to inhibit supply of electrical power from the second power distribution component to the busway system.

5. The electrical distribution system of claim 3, wherein:
   in response to the one or more conditions being met, the interlock system is configured to allow the second switch to be transferred from an open state to a closed state.

6. The electrical distribution system of claim 3, wherein:
   the interlock system comprises a key interlock system.

7. The electrical distribution system of claim 6, wherein:
   the interlock system comprises:

a first key interlock device associated with the first switch;
a second key interlock device associated with the second switch; and
a key release unit associated with the first key interlock device and the second key interlock device.

8. The electrical distribution system of claim 7, wherein: the key release unit is configured to:
retain a key, wherein the key is configured to operate at least one of the first key interlock device or the second key interlock device; and
at least one of:
allow removal of the key from the key release unit in response to the one or more conditions being met; or
inhibit removal of the key from the key release unit in response to a condition of the one or more conditions not being met.

9. The electrical distribution system of claim 8, wherein at least one of:
upon operation of the key with the first key interlock device, the first key interlock device is configured to allow access to operate the first switch; or
upon operation of the key with the second key interlock device, the second key interlock device is configured to allow access to operate the second switch.

10. The electrical distribution system of claim 3, wherein: the interlock system comprises:
a first electrical interlock device associated with the first switch; and
a second electrical interlock device associated with the second switch.

11. The electrical distribution system of claim 10, wherein at least one of:
in response to the one or more conditions being met, the first electrical interlock device is configured to allow access to operate the first switch;
in response to a condition of the one or more conditions not being met, the first electrical interlock device is configured to block access to operate the first switch;
in response to the one or more conditions being met, the second electrical interlock device is configured to allow access to operate the second switch; or
in response to a condition of the one or more conditions not being met, the second electrical interlock device is configured to block access to operate the second switch.

12. The electrical distribution system of claim 3, wherein: the busway system comprises:
a third switch and a fourth switch, wherein:
a first side of the third switch is connected to a first side of the busway;
a second side of the third switch is connected to the second side of the first switch;
a first side of the fourth switch is connected to a second side of the busway; and
a second side of the fourth switch is connected to the second side of the second switch.

13. A method, comprising:
determining whether first electrical power of a first power distribution component and second electrical power of a second power distribution component meet one or more conditions, wherein the first power distribution component and the second power distribution component are connected to a busway system comprising a busway;
in response to a condition of the one or more conditions not being met, inhibiting supply of electrical power from the second power distribution component to the busway system,
wherein:
the inhibiting supply of electrical power from the second power distribution component to the busway system comprises inhibiting a switch from being transferred from an open state to a closed state;
a first side of the switch is connected to a circuit of the second power distribution component; and
a second side of the switch is connected to the busway system; and
at least one of:
the method comprises:
in response to the one or more conditions being met, allowing, using an interlock device, access to operate the switch; or
in response to a condition of the one or more conditions not being met, blocking, using the interlock device, access to operate the switch; or
the method comprises at least one of:
allowing removal of a key from a key release unit in response to the one or more conditions being met; or
inhibiting removal of the key from the key release unit in response to a condition of the one or more conditions not being met,
wherein:
the key is configured to operate at least one of a first key interlock device associated with a second switch or a second key interlock device associated with the switch;
a first side of the second switch is connected to a second circuit of the first power distribution component; and
a second side of the second switch is connected to the busway system.

14. The method of claim 13, wherein the determining whether the first electrical power and the second electrical power meet the one or more conditions comprises:
measuring, using a measurement device, at least one of a first voltage of the first electrical power, a second voltage of the second electrical power, a first frequency of the first electrical power, a second frequency of the second electrical power, a first rotation of the first electrical power or a second rotation of the second electrical power, wherein the one or more conditions comprise a first condition that the first electrical power and the second electrical power are synchronized; and
determining whether the first electrical power and the second electrical power meet the first condition based upon at least one of the first voltage, the second voltage, the first frequency, the second frequency, the first rotation or the second rotation.

15. The method of claim 13, comprising:
in response to the one or more conditions being met, allowing the switch to be transferred from an open state to a closed state.

16. The method of claim 13, wherein:
the method comprises at least one of:
allowing removal of the key from the key release unit in response to the one or more conditions being met; or
inhibiting removal of the key from the key release unit in response to a condition of the one or more conditions not being met;

the key is configured to operate at least one of the first key interlock device associated with the second switch or the second key interlock device associated with the switch;

the first side of the second switch is connected to the second circuit of the first power distribution component; and the second side of the second switch is connected to the busway system.

17. The method of claim 16, wherein at least one of:

upon operation of the key with the first key interlock device, the first key interlock device is configured to allow access to operate the second switch; or upon operation of the key with the second key interlock device, the second key interlock device is configured to allow access to operate the switch.

18. The method of claim 13, comprising:

in response to the one or more conditions being met, allowing, using the interlock device, access to operate the switch; or in response to a condition of the one or more conditions not being met, blocking, using the interlock device, access to operate the switch.

19. An interlock system comprising:

a processor; and memory comprising processor-executable instructions that when executed by the processor cause performance of operations, the operations comprising:

determining whether first electrical power of a first power distribution component and second electrical power of a second power distribution component meet one or more conditions, wherein the first power distribution component is connected to a first isolation switch of a busway system comprising a busway, wherein the second power distribution component is connected to a second isolation switch of the busway system;

when the one or more conditions are met, allowing supply of electrical power from the first power distribution component to the busway system via the first isolation switch and allowing supply of electrical power from the second power distribution component to the busway system via the second isolation switch;

in response to a condition of the one or more conditions not being met, inhibiting supply of electrical power from the first power distribution component to the busway system via the first isolation switch; and in response to a second condition of the one or more conditions not being met, inhibiting supply of electrical power from the second power distribution component to the busway system via the second isolation switch.

20. An electrical distribution system comprising:

a first power distribution component connected to a busway system comprising a busway;

a second power distribution component connected to the busway system; and an interlock system configured to:

determine whether first electrical power of the first power distribution component and second electrical power of the second power distribution component meet one or more conditions; and in response to a condition of the one or more conditions not being met, inhibit supply of electrical power from the second power distribution component to the busway system, wherein at least one of:

the busway system comprises a first switch and a second switch and the interlock system comprises:

a first key interlock device associated with the first switch;

a second key interlock device associated with the second switch; and a key release unit associated with the first key interlock device and the second key interlock device;

the interlock system comprises:

a first electrical interlock device associated with the first switch; and a second electrical interlock device associated with the second switch; or the busway system comprises:

a third switch and a fourth switch, wherein:

a first side of the first switch is connected to a first circuit of the first power distribution component;

a second side of the first switch is connected to the busway system;

a first side of the second switch is connected to a second circuit of the second power distribution component;

a second side of the second switch is connected to the busway system;

a first side of the third switch is connected to a first side of the busway;

a second side of the third switch is connected to the second side of the first switch;

a first side of the fourth switch is connected to a second side of the busway; and a second side of the fourth switch is connected to the second side of the second switch.

* * * * *